United States Patent [19]

Delp

[11] Patent Number: 5,420,967
[45] Date of Patent: May 30, 1995

[54] METHOD AND APPARATUS FOR THE EFFICIENT GENERATION OF HIGH QUALITY IMAGES IN A COMPUTER SYSTEM UTILIZING AN INTERCONNECTED IMAGE STATE TABLE

[75] Inventor: Helen R. Delp, Rochester, Minn.

[73] Assignee: International Business Machines Corporation, Armonk, N.Y.

[21] Appl. No.: 974,866

[22] Filed: Nov. 10, 1992

[51] Int. Cl.⁶ .............................................. G06T 3/00
[52] U.S. Cl. ..................................... 395/133; 395/136
[58] Field of Search ............................... 395/133–139, 395/140, 141, 325; 358/426; 382/56

[56] References Cited

U.S. PATENT DOCUMENTS

| | | | |
|---|---|---|---|
| 5,065,447 | 11/1991 | Barnsley et al. | 382/56 |
| 5,226,125 | 7/1993 | Balmer et al. | 395/325 |
| 5,245,441 | 9/1993 | Ruben | 358/426 |
| 5,263,136 | 11/1993 | DeAguiar et al. | 395/164 |

*Primary Examiner*—Almis R. Jankus
*Attorney, Agent, or Firm*—Richard E. Billion; Andrew J. Dillon

[57] ABSTRACT

A method and apparatus for the efficient generation of high quality images in a computer system is provided. A user requests that one or more images be generated. Representation of each requested image and any existing images are added to an image table. Representations of a group of intermediate images are then added to the image table. Each intermediate image corresponds to a change of an image state between an existing image and a requested image. For example, if a requested image is smaller than an existing image, the scaling of the existing image is a change of image state and will result in the addition of the representation of an intermediate image to the image table. Note that the intermediate image itself is not actually computed or generated at this time. After the representation of each intermediate image has been added to the image table, image paths are built from any existing image to any requested image. An image path includes an existing image, a series of one or more intermediate images, and a requested image. After a network of all the image paths are built, a "cost" of computing the image is calculated for each image path. After these calculations are complete, an optimal image path is selected. The requested image is then generated in a manner determined by the optimal image path. If more than one image is requested, the optimal image path for each requested image is determined by looking at combinations of image paths so that intermediate images generated for one requested image can be used by other requested images.

21 Claims, 33 Drawing Sheets

Scale State Table

| State | Width | Height |
|-------|-------|--------|
| 1 | 768 | 1024 |
| 2 | 576 | 768 |
| 3 | 384 | 512 |
| 4 | 192 | 256 |

FIG. 5A

Rotation State Table

| State | Orientation |
|-------|-------------|
| 1 | 90 degrees ccw |
| 2 | normal viewing |

FIG. 5B

Match State Table

| State | Color Matrix ID 510 | Non-Linear Table ID 520 | Valid Conversion States |
|-------|---------------------|-------------------------|-------------------------|
| 1 | Nikon scanner | gamma 1.4 | 1 |
| 2 | 6091 monitor | gamma 2.7 | 1,2 |
| 3 | 8514 monitor | gamma 2.2 | 1,3 |

FIG. 5C

Conversion State Table 530

| State | Conversion | Non-Linear Table ID | Bytes/Pixel |
|---|---|---|---|
| 1 | none | none | 3 |
| 2 | dither | dither table | 2 |
| 3 | error-diffuse | palette table | 1 |

FIG. 5D

Color Matrix ID

| 2.570 | -1.309 | -.392 | -.828 | 1.615 | 0.021 | 0.053 | -.193 | 1.140 |

FIG. 5G

Palette Table

| 0 | 40 | 237 | 630 | 1386 | 2448 | 4095 | 0 | 27 | 106 | 381 | 853 | 1601 | 2592 | 4095 | 0 | 285 | 1521 | 4095 |

FIG. 5I

Image Table:

| imag | status 550 | scale state 561 | match state 562 | rotate state 563 | convert state 564 | compress 570 | Correct Original dynamic range 581 | gamma correct 582 | sigma correct 583 |
|---|---|---|---|---|---|---|---|---|---|
| 0 |  |  |  |  |  |  |  |  |  |
| 1 | 1 | 1 | 1 | 1 | 1 | Y | Y | Y | Y |
| 2 | 3 | 1 | 1 | 1 | 1 | N | Y | Y | Y |
| 3 | 3 | 1 | 2 | 1 | 1 | N | Y | Y | Y |
| 4 | 3 | 1 | 3 | 1 | 1 | N | Y | Y | Y |
| 5 | 3 | 1 | 3 | 1 | 3 | N | Y | Y | Y |
| 6 | 3 | 1 | 2 | 1 | 2 | N | Y | Y | Y |
| 7 | 3 | 1 | 1 | 2 | 1 | N | Y | Y | Y |
| 8 | 3 | 1 | 2 | 2 | 1 | N | Y | Y | Y |
| 9 | 3 | 1 | 3 | 2 | 3 | N | Y | Y | Y |
| 10 | 3 | 1 | 3 | 2 | 2 | N | Y | Y | Y |
| 11 | 2 | 2 | 2 | 2 | 1 | N | Y | Y | Y |
| 12 | 3 | 2 | 1 | 1 | 1 | N | Y | Y | Y |
| 13 | 3 | 2 | 2 | 1 | 1 | N | Y | Y | Y |
| 14 | 3 | 2 | 3 | 1 | 3 | N | Y | Y | Y |
| 15 | 3 | 2 | 3 | 1 | 2 | N | Y | Y | Y |
| 16 | 3 | 2 | 1 | 2 | 1 | N | Y | Y | Y |
| 17 | 3 | 2 | 2 | 2 | 1 | N | Y | Y | Y |
| 18 | 3 | 2 | 2 | 2 | 1 | N | Y | Y | Y |
| 19 | 3 | 2 | 3 | 2 | 1 | N | Y | Y | Y |

| Y Y Y Y Y Y Y Y Y Y Y Y Y Y Y Y Y Y Y Y Y Y |
|---|
| Y Y Y Y Y Y Y Y Y Y Y Y Y Y Y Y Y Y Y Y Y Y |
| Y Y Y Y Y Y Y Y Y Y Y Y Y Y Y Y Y Y Y Y Y Y |
| Z Z Z Z Z Z Z Z Z Z Z Z Z Z Z Z Z Z Z Z Z Z |
| 3 2 1 1 1 3 2 1 1 1 3 2 1 1 1 3 2 1 1 1 3 2 |
| 2 2 1 1 1 1 2 2 2 2 1 1 1 1 2 2 2 2 |
| 3 2 1 2 3 3 2 1 2 3 3 2 1 2 3 3 2 1 2 3 3 2 |
| 2 2 3 3 3 3 3 3 3 3 4 4 4 4 4 4 4 4 4 4 |
| 2 3 3 3 1 3 3 3 3 2 3 3 3 3 3 3 3 2 3 |
| 20 21 22 23 24 25 26 27 28 29 30 31 32 33 34 35 36 37 38 39 40 41 |

| Image | Path | Image Sequence | Deterioration |
|---|---|---|---|
| 11 | 1 | 0 7 8 11 | 4 |
| 11 | 2 | 0 3 8 11 | 4 |
| 11 | 3 | 0 3 6 11 | 4 |
| 20 | 1 | 0 12 14 15 20 | 11 |
| 20 | 2 | 0 12 17 19 20 | 11 |
| 20 | 3 | 0 12 14 19 20 | 11 |
| 20 | 4 | 0 4 14 15 20 | 11 |
| 20 | 5 | 0 4 14 19 20 | 11 |
| 20 | 6 | 0 4 9 19 20 | 11 |
| 20 | 7 | 0 7 9 19 20 | 11 |
| 20 | 8 | 0 7 17 19 20 | 11 |
| 30 | 1 | 0 12 22 24 25 30 | 12 |
| 30 | 2 | 0 12 22 24 29 30 | 12 |
| 30 | 3 | 0 12 22 27 29 30 | 12 |
| 30 | 4 | 0 12 14 24 29 30 | 12 |
| 30 | 5 | 0 12 14 24 25 30 | 12 |
| 30 | 6 | 0 12 14 19 29 30 | 12 |
| 30 | 7 | 0 12 17 19 29 30 | 12 |
| 30 | 8 | 0 12 17 27 29 30 | 12 |
| 30 | 9 | 0 4 14 24 25 30 | 12 |
| 30 | 10 | 0 4 14 24 29 30 | 12 |
| 30 | 11 | 0 4 14 19 29 30 | 12 |
| 30 | 12 | 0 4 9 19 29 30 | 12 |
| 30 | 13 | 0 7 17 27 29 30 | 12 |
| 30 | 14 | 0 7 17 19 29 30 | 12 |
| 30 | 15 | 0 7 9 19 29 30 | 12 |
| 30 | 16 | 25 30 | 12 |
| 40 | 1 | 0 12 32 34 35 40 | 13 |
| 40 | 2 | 0 12 14 34 35 40 | 13 |

FIG. 5F

Non-Linear Table

| | | | | |
|---|---|---|---|---|
| 0 | 0 | 0 | 1 | 2 |
| 3 | 4 | 6 | 8 | 9 |
| 12 | 14 | 16 | 19 | 22 |
| 24 | 28 | 31 | 34 | 38 |
| 41 | 45 | 49 | 53 | 58 |
| 62 | 67 | 71 | 76 | 81 |
| 86 | 92 | 97 | 103 | 108 |
| 114 | 120 | 126 | 133 | 139 |
| 145 | 152 | 159 | 166 | 173 |
| 180 | 187 | 195 | 202 | 210 |
| 218 | 225 | 234 | 242 | 250 |
| 258 | 267 | 276 | 284 | 293 |
| 302 | 311 | 321 | 330 | 340 |
| 349 | 359 | 369 | 379 | 389 |
| 399 | 409 | 420 | 430 | 441 |
| 452 | 463 | 474 | 485 | 496 |
| 508 | 519 | 531 | 543 | 554 |
| 566 | 578 | 591 | 603 | 615 |
| 628 | 640 | 653 | 666 | 679 |
| 692 | 705 | 718 | 732 | 745 |
| 759 | 773 | 786 | 800 | 814 |
| 829 | 843 | 857 | 872 | 886 |
| 901 | 916 | 931 | 946 | 961 |
| 976 | 991 | 1007 | 1022 | 1038 |
| 1054 | 1070 | 1086 | 1102 | 1118 |
| 1134 | 1151 | 1167 | 1184 | 1201 |
| 1217 | 1234 | 1251 | 1268 | 1286 |
| 1303 | 1320 | 1338 | 1356 | 1373 |
| 1391 | 1409 | 1427 | 1445 | 1463 |
| 1482 | 1500 | 1519 | 1537 | 1556 |
| 1575 | 1594 | 1613 | 1632 | 1652 |
| 1671 | 1690 | 1710 | 1730 | 1749 |
| 1769 | 1789 | 1809 | 1829 | 1850 |
| 1870 | 1890 | 1911 | 1932 | 1952 |
| 1973 | 1994 | 2015 | 2036 | 2058 |
| 2079 | 2100 | 2122 | 2144 | 2165 |
| 2187 | 2209 | 2231 | 2253 | 2275 |
| 2298 | 2320 | 2343 | 2365 | 2388 |
| 2411 | 2434 | 2457 | 2480 | 2503 |
| 2526 | 2550 | 2573 | 2597 | 2620 |
| 2644 | 2668 | 2692 | 2716 | 2740 |
| 2764 | 2788 | 2813 | 2837 | 2862 |
| 2887 | 2911 | 2936 | 2961 | 2986 |
| 3012 | 3037 | 3062 | 3088 | 3113 |
| 3139 | 3165 | 3190 | 3216 | 3242 |
| 3268 | 3295 | 3321 | 3347 | 3374 |
| 3400 | 3427 | 3454 | 3481 | 3508 |
| 3535 | 3562 | 3589 | 3616 | 3644 |
| 3671 | 3699 | 3726 | 3754 | 3782 |
| 3810 | 3838 | 3866 | 3894 | 3923 |
| 3951 | 3980 | 4008 | 4037 | 4066 |
| 4095 | | | | |

FIG. 5H

Dither Table

| | | |
|---|---|---|
| 0 0 0 0 | 0 0 0 0 | 0 0 0 0 |
| 4 3 3 4 | 9 8 8 9 | 5 5 5 5 |
| 4 4 4 4 | 9 9 9 9 | 5 5 5 5 |
| 5 4 4 4 | 10 9 9 9 | 6 5 5 5 |
| 5 4 4 4 | 10 9 9 10 | 6 5 5 5 |
| 5 4 4 5 | 10 10 9 10 | 6 5 5 6 |
| 5 4 4 5 | 10 10 10 10 | 6 5 5 6 |
| 5 5 4 5 | 11 10 10 10 | 6 6 5 6 |
| 5 5 4 5 | 11 10 10 10 | 6 6 5 6 |
| 5 5 5 5 | 11 10 10 11 | 6 6 6 6 |
| 5 5 5 5 | 11 11 10 11 | 6 6 6 6 |
| 6 5 5 5 | 11 11 10 11 | 6 6 6 6 |
| 6 5 5 5 | 11 11 11 11 | 6 6 6 6 |
| 6 5 5 5 | 12 11 11 11 | 7 6 6 6 |
| 6 5 5 5 | 12 11 11 11 | 7 6 6 6 |
| 6 5 5 6 | 12 11 11 12 | 7 6 6 6 |
| 6 5 5 6 | 12 11 11 12 | 7 6 6 6 |
| 6 5 5 6 | 12 12 11 12 | 7 6 6 7 |
| 6 6 5 6 | 12 12 11 12 | 7 6 6 7 |
| 6 6 5 6 | 12 12 12 12 | 7 6 6 7 |
| 6 6 5 6 | 12 12 12 12 | 7 6 6 7 |
| . | . | . |
| . | . | . |
| . | . | . |
| . | . | . |
| . | . | . |
| . | . | . |
| 31 31 31 31 | 63 63 63 63 | 31 31 31 31 |
| 31 31 31 31 | 63 63 63 63 | 31 31 31 31 |
| 31 31 31 31 | 63 63 63 63 | 31 31 31 31 |

FIG. 5J

Adjacency Matrix of Computation Costs

|    | 0 | 3  | 4  | 5   | 6 | 7  | 8  | 9   | 10  | 11 | 12   | 13   | 14   | 15 | 16 | 17   | 18   | 19   | 20 |
|----|---|----|----|-----|---|----|----|-----|-----|----|------|------|------|----|----|------|------|------|----|
| 0  | - | 75 | 75 |     |   | 76 |    |     |     |    | 2000 |      |      |    |    |      |      |      |    |
| 3  |   | -  |    | 21  |   | 76 |    |     |     |    |      | 2000 |      |    |    |      |      |      |    |
| 4  |   |    | -  | 126 |   |    | 76 |     |     |    |      |      | 2000 |    |    |      |      |      |    |
| 5  |   |    |    | -   |   |    |    | 29  |     |    |      |      |      |    |    |      |      |      |    |
| 6  |   |    |    |     | - |    |    |     | 29  |    |      |      |      |    |    |      |      |      |    |
| 7  |   |    |    |     |   | -  | 75 | 75  |     |    |      |      |      |    |    | 2000 |      |      |    |
| 8  |   |    |    |     |   |    | -  |     |     | 21 |      |      |      |    |    |      | 2000 |      |    |
| 9  |   |    |    |     |   |    |    | -   | 126 |    |      |      |      |    |    |      |      | 2000 |    |
| 10 |   |    |    |     |   |    |    |     | -   |    |      |      |      |    |    |      |      |      |    |
| 11 |   |    |    |     |   |    |    |     |     | -  |      |      |      |    |    |      |      |      |    |
| 12 |   |    |    |     |   |    |    |     |     |    | -    | 43   | 43   |    |    | 45   |      |      |    |
| 13 |   |    |    |     |   |    |    |     |     |    |      | -    |      |    | 12 |      | 45   |      |    |
| 14 |   |    |    |     |   |    |    |     |     |    |      |      | -    | 70 |    |      |      | 45   |    |
| 15 |   |    |    |     |   |    |    |     |     |    |      |      |      | -  |    |      |      |      | 18 |
| 16 |   |    |    |     |   |    |    |     |     |    |      |      |      |    | -  |      |      |      |    |
| 17 |   |    |    |     |   |    |    |     |     |    |      |      |      |    |    | -    | 43   | 43   |    |
| 18 |   |    |    |     |   |    |    |     |     |    |      |      |      |    |    |      | -    |      |    |
| 19 |   |    |    |     |   |    |    |     |     |    |      |      |      |    |    |      |      | -    | 70 |
| 20 |   |    |    |     |   |    |    |     |     |    |      |      |      |    |    |      |      |      | -  |

Adjacency Matrix of image deterioration

|    | 0 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|----|----|----|----|----|----|----|----|----|----|----|
| 0  | - | 1 | 1 |   |   | 0 |   |   |    |    | 1  |    |    |    |    |    |    |    |    |
| 3  |   | - |   | 3 |   | 0 |   |   |    |    |    | 1  |    |    |    |    |    |    |    |
| 4  |   |   | - | 9 |   |   | 0 |   |    |    |    |    | 1  |    |    |    |    |    |    |
| 5  |   |   |   | - |   |   |   | 0 |    |    |    |    |    |    |    |    |    |    |    |
| 6  |   |   |   |   | - |   |   |   |    | 0  |    |    |    |    |    |    |    |    |    |
| 7  |   |   |   |   |   | - | 1 | 1 |    |    |    |    |    |    |    | 1  |    |    |    |
| 8  |   |   |   |   |   |   | - |   |    | 3  |    |    |    |    |    |    | 1  |    |    |
| 9  |   |   |   |   |   |   |   | - | 9  |    |    |    |    |    |    |    |    | 1  |    |
| 10 |   |   |   |   |   |   |   |   | -  |    |    |    |    |    |    |    |    |    |    |
| 11 |   |   |   |   |   |   |   |   |    | -  |    |    |    |    |    |    |    |    |    |
| 12 |   |   |   |   |   |   |   |   |    |    | -  | 1  | 1  |    |    | 0  |    |    |    |
| 13 |   |   |   |   |   |   |   |   |    |    |    | -  |    | 3  |    | 0  |    |    |    |
| 14 |   |   |   |   |   |   |   |   |    |    |    |    | -  | 9  |    |    |    | 0  |    |
| 15 |   |   |   |   |   |   |   |   |    |    |    |    |    | -  |    |    |    |    | 0  |
| 16 |   |   |   |   |   |   |   |   |    |    |    |    |    |    | -  |    |    |    |    |
| 17 |   |   |   |   |   |   |   |   |    |    |    |    |    |    |    | -  | 1  | 1  |    |
| 18 |   |   |   |   |   |   |   |   |    |    |    |    |    |    |    |    | -  |    |    |
| 19 |   |   |   |   |   |   |   |   |    |    |    |    |    |    |    |    |    | -  | 9  |
| 20 |   |   |   |   |   |   |   |   |    |    |    |    |    |    |    |    |    |    | -  |

```
                    REQUEST IMAGE
```

```
Image Height          =========>  1024
Image Width           =========>  768
Device                =========>  IBM 8514 Display
Orientation           =========>  Normal Viewing
Quality Threshold     =========>  15
Save Requested Image  ======>     Y
Save Intermediate Images == >     N
Display Requested Images == >     Y
Gamma Correction      ========>   1.4
Sigma Correction      ========>   10
Dynamic Range Adjust  ======>     Y F6 = Send all requests    F10 = Request Another Image
```

FIG. 12

METHOD AND APPARATUS FOR THE EFFICIENT GENERATION OF HIGH QUALITY IMAGES IN A COMPUTER SYSTEM UTILIZING AN INTERCONNECTED IMAGE STATE TABLE

FIELD OF THE INVENTION

This invention relates to the data processing field. More particularly, this invention relates to the efficient generation of high quality images in a computer system.

BACKGROUND OF THE INVENTION

General purpose computer systems of yesteryear were largely limited to the display of textual information. In fact, the early computer displays were incapable of displaying anything other than words, or crude drawings made from text related symbols commonly found on a keyboard, such as ":-)". While text and silly symbols were just fine for some people, many people with expressive personalities wanted the ability to display real graphics on their computer display. Gradually, computer displays started supporting graphics. Early graphics were displayed in what became known as "CGA mode" CGA mode divided the computer display up into rows of 640 pixels and columns of 200 pixels. While images displayed in CGA mode were relatively easy to generate and display since they did not require a tremendous amount of data, the resolution of an image displayed in CGA mode was grainy and only of marginal quality.

Users quickly became dissatisfied with the quality of CGA mode monitors, and began demanding something better. EGA mode increased the resolution of the image to 640×350 pixels, but users still weren't very happy.

When VGA mode increased the resolution to 640×480 pixels, users started to realize that their computers were now capable of displaying high quality images, either still or animated. This realization opened up a whole new computer market now commonly (if imprecisely) known today as "multimedia". Images of near photographic quality are now finding their way onto CD-ROM collections of images relating to a particular subject matter, and into application programs themselves, such as multimedia encyclopedias.

Technology marched on, and monitors supporting SVGA mode (768×1024 pixels) are now commonly available. Users have fallen in love with the power and pizzazz of multimedia, and want to display as many images as possible. The problem is that an SVGA image takes up a tremendous amount of storage space, and can take a considerable amount of computer processing power to generate. It is not uncommon for even high powered computers to take several seconds or even minutes to generate a single image. Many users find this response time unacceptable, since they are used to sub-second response time commonly achieved in the much simpler world of text processing. Storing every image the user could possibly want to display on a high speed storage medium would be nice in theory, but lacks practicability due to the multitude of ways a single image can be displayed (rotated, scaled, reverse image, etc), to the variation in the capabilities of individual displays, and to the massive amount of storage required to even contemplate such a thing.

For now, users feel a sense of frustration. They see that this amazingly powerful multimedia technology is just outside their grasp, due to the inefficient manner in which high quality images are currently being generated. This failure has resulted in a shared hesitancy among both users and application developers to fully adopt and embrace this new technology.

SUMMARY OF THE INVENTION

It is a principle object of the invention to efficiently generate high quality images in a computer system.

These and other objects are accomplished by the method and apparatus for the efficient generation of high quality images in a computer system disclosed herein.

A method and apparatus for the efficient generation of high quality images in a computer system is disclosed. A user requests that one or more images be generated. Representation of each requested image and any images that already have been generated and stored are added to an image table. Representations of a group of intermediate images are then added to the image table. Each intermediate image corresponds to a change of an image state between an existing image and a requested image. For example, if a requested image is smaller than an existing image, the scaling of the existing image is a change of image state and will result in the addition of the representation of an intermediate image to the image table. Note that the intermediate image itself is not actually computed or generated at this time.

After the representation of each intermediate image has been added to the image table, image paths are built from any existing image to any requested image. An image path includes an existing image, a series of one or more intermediate images, and a requested image. After a network of all the image paths are built, a "cost" of computing the image is calculated for each image path. After these calculations are complete, an optimal image path is selected. The requested image is then generated in a manner determined by the optimal image path. If more than one image is requested, the optimal image path for each requested image is determined by looking at combinations of image paths so that intermediate images generated for one requested image can be used by other requested images.

BRIEF DESCRIPTION OF THE DRAWING

FIGS. 5A–5J show tables defining parameters used in practicing of the invention.

FIG. 12 shows an exemplary display screen of the invention.

DESCRIPTION OF THE PREFERRED EMBODIMENT

Figure 1:
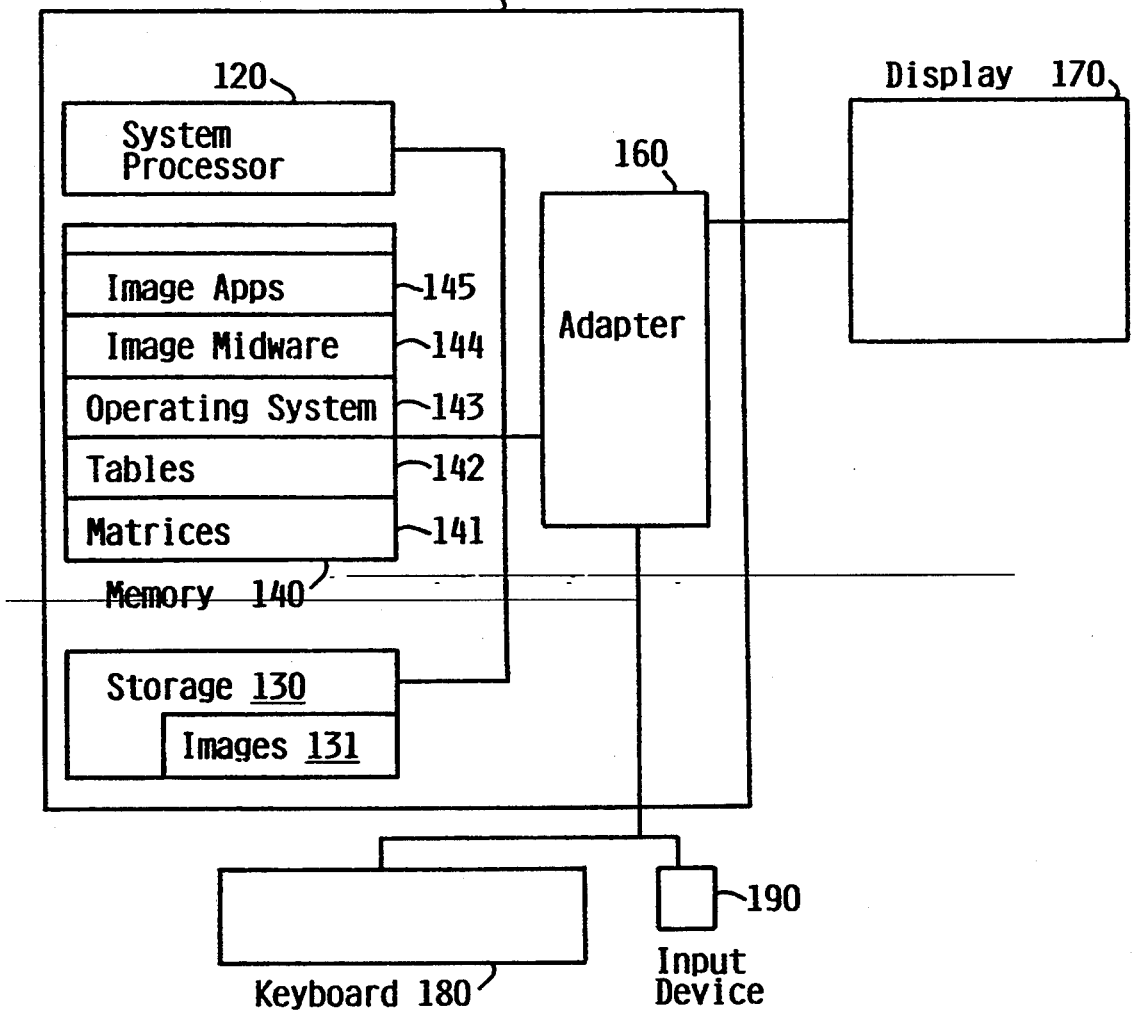
FIG. 1 shows a block diagram of the computer system of the invention.

FIG. 1 shows a block diagram of computer system 100 of the invention. Computer system 100 has display 170, keyboard 180, and input device 190, each of which is connected to system unit 110. System unit 110 contains processor 120 connected to memory 140, storage 130, and display adapter 160. Processor 120 is suitably programmed to carry out this invention, as described in more detail in the flowcharts of FIGS. 7–11. Memory 140 contains matrices 141, tables 142, operating system 143, image midware 144, and one or more image applications 145. Storage 130 contains existing images 131.

In the preferred embodiment, computer system 100 is an IBM PS/2, where processor 120 is an Intel 80486DX microprocessor. Display adapter 160 is an IBM SVGA display adapter, and display 170 is an IBM 8515 display. Input device 190 is preferably an IBM mouse but may also be a track ball, light pen, or other input device. Storage 130 is preferably a conventional magnetic storage device, but could also be a read/write optical device, tape device, or other high speed storage device. Operating system 143 is preferably OS/2 2.0 with Presentation Manager, but could be Microsoft Windows 3.1, or another operating system. Tables 142 are shown in more detail in FIG. 5. Matrices 141 are shown in more detail in FIG. 6. Image midware 144 is a software program suitably programmed to cause processor 120 to execute the flowcharts of FIG. 7–11. Image applications 145 use image midware 144 to generate images used by the application program.

Computer system 100 could also be another type of computer system, whether it be another microcomputer such as an Apple Macintosh, a minicomputer such as an IBM AS/400, or a mainframe computer such as an IBM System/390, and still fall within the spirit and scope of this invention. In addition, computer system 100 can be a microcomputer such as described above, connected to a larger computer system such as an IBM AS/400. If connected to a larger system, processor 120 may share responsibilities for executing the flowchart of FIGS. 7–11 with one or more other processors (not shown) contained in the larger system. Storage 130 and/or memory 140 could also be distributed to other systems connected to computer system 100.

Figure 2:
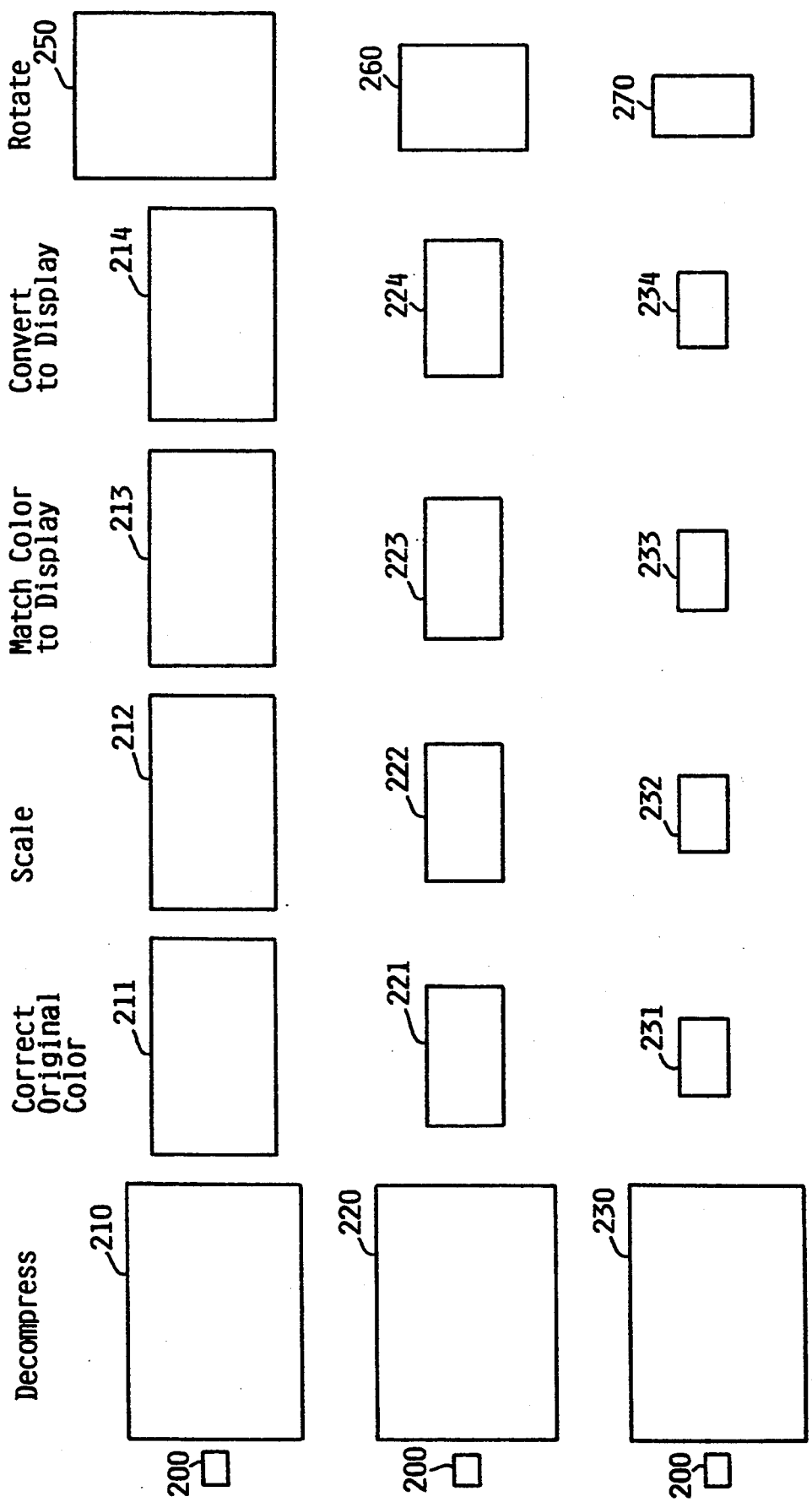
FIG. 2 shows a prior art method of generating a series of images

FIG. 2 shows a prior art method of generating a series of images. Image 200 is an existing compressed image. High quality images 250, 260, and 270 are to be generated from this compressed image. In order to generate high quality image 250, image 200 must first be decompressed, corrected to the original color (also known as dynamic range adjust, input gamma correct, and/or sigma correct), scaled to the correct size, matched to the color of the display (also known as linear transformation), converted to the resolution of the display (also known as halftoning, dithering, and/or diffusing), and rotated. After image 250 is generated, temporary images 210–214 are discarded.

Generating image 260 again requires that compressed image 200 be decompressed, scaled to the correct size, corrected to the original color, matched to the color of the display, converted to the resolution of the display, and rotated. The process is repeated to generate image 270. The generation of images 250, 260, and 270 using prior art techniques requires the execution of eighteen highly computational intensive steps.

Figure 3:
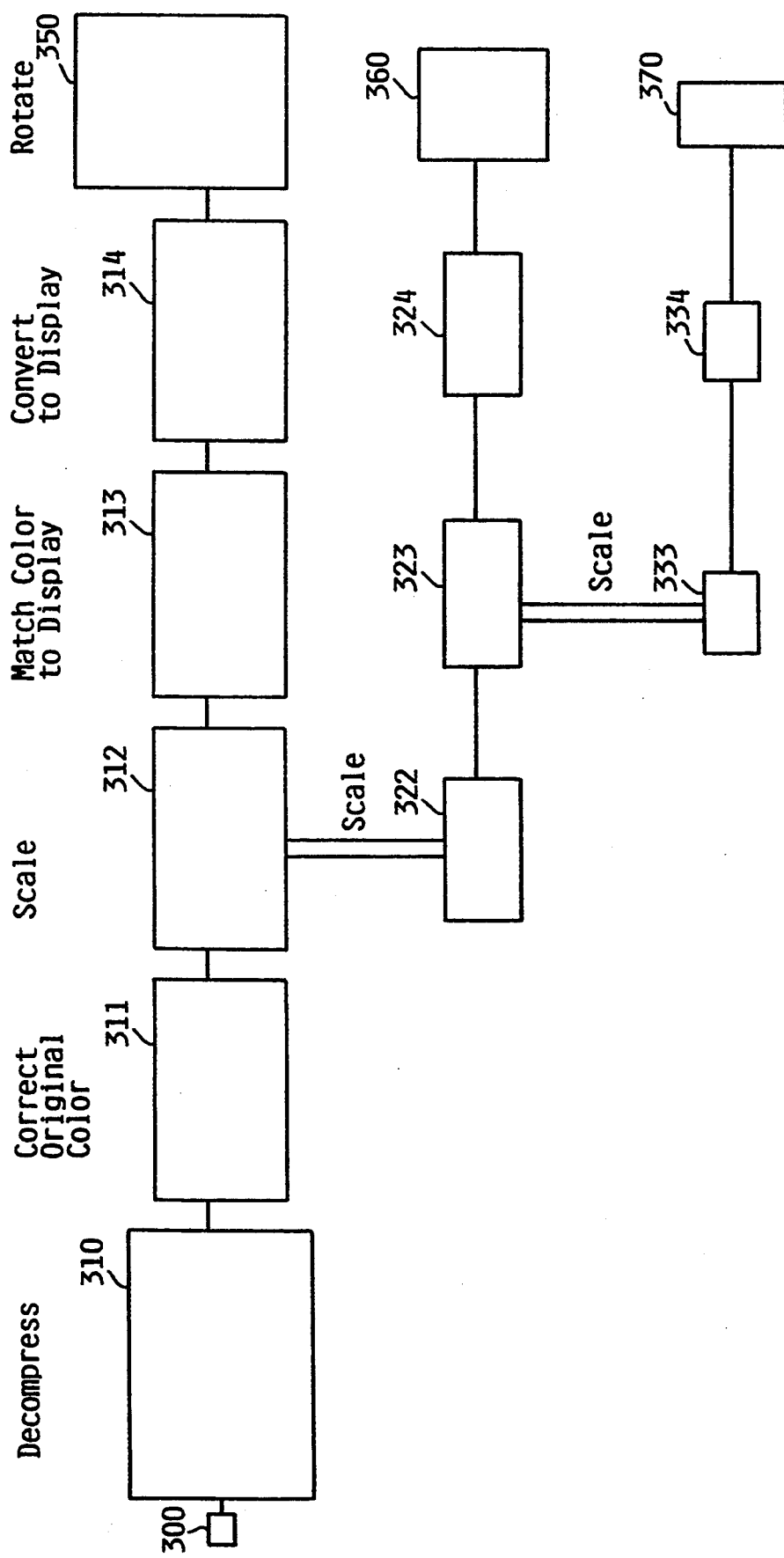
FIG. 3 shows a simplified representation of the generation of a series of images using the method of the invention.

FIG. 3 shows a simplified representation of the generation of a series of images using the method of the invention. Image 300 is an existing compressed image. High quality images 350, 360, and 370 are to be generated from this compressed image. In order to generate high quality image 350, image 300 must, like the prior art method described above, first be decompressed, scaled to the correct size, corrected to the original color, matched to the color of the display, converted to the resolution of the display, and rotated. Those skilled in the art will appreciate that while it may be possible to leave out some of these steps in a particular implementation, a high quality image of the desired size and orientation requires these or similar steps. Images 310–314 are not temporary images like the prior art, but are instead intermediate images that are not discarded until after images 350, 360, and 370 are all created, and may even be optionally saved after this time as well. Requested image 360 is not created from compressed image 300 as in the prior art, but instead is created from intermediate image 312. Intermediate image 312 is scaled, matched to the color of the display, converted to the resolution of the display, and rotated. Intermediate images 322–324 are created in the process of generating requested image 360. Since image 360 has been prepared for a different device than image 350, intermediate images 313 and 314 could not have been used to prepare image 360.

Requested image 370 is not created from compressed image 300 as in the prior art, but instead is created from intermediate image 323. Intermediate image 323 is scaled, converted to the resolution of the display, and rotated. Intermediate images 333–334 are created in the process of generating requested image 370. Although image 370 has been prepared for the same device as image 360, and intermediate image 324 could have been used to generate image 370 instead of intermediate image 323, the preferred embodiment does not use this intermediate image, since scaling an image that has already been converted to the resolution of a device yields poor quality. The generation of images 350, 360, and 370 in the preferred embodiment requires the execution of thirteen highly computational intensive steps, five fewer steps than was required in the prior art generation of images 250, 260 and 270. This reduction of these steps resulted in much faster processing time, without sacrificing image quality.

Figure 4A:
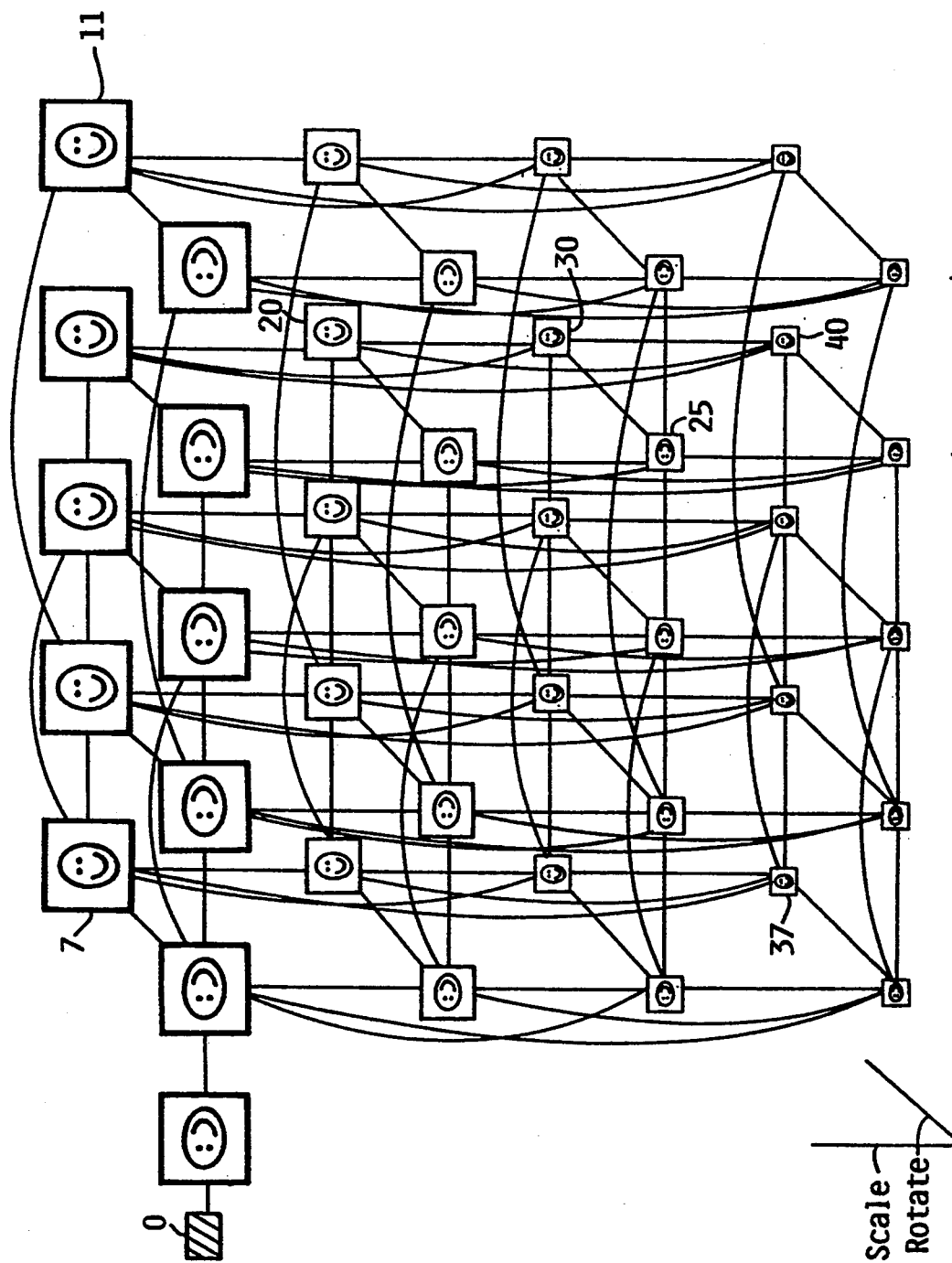
FIGS. 4A–4C show a more detailed representation of the generation of a series of images using the method of the invention.
Figure 4B:
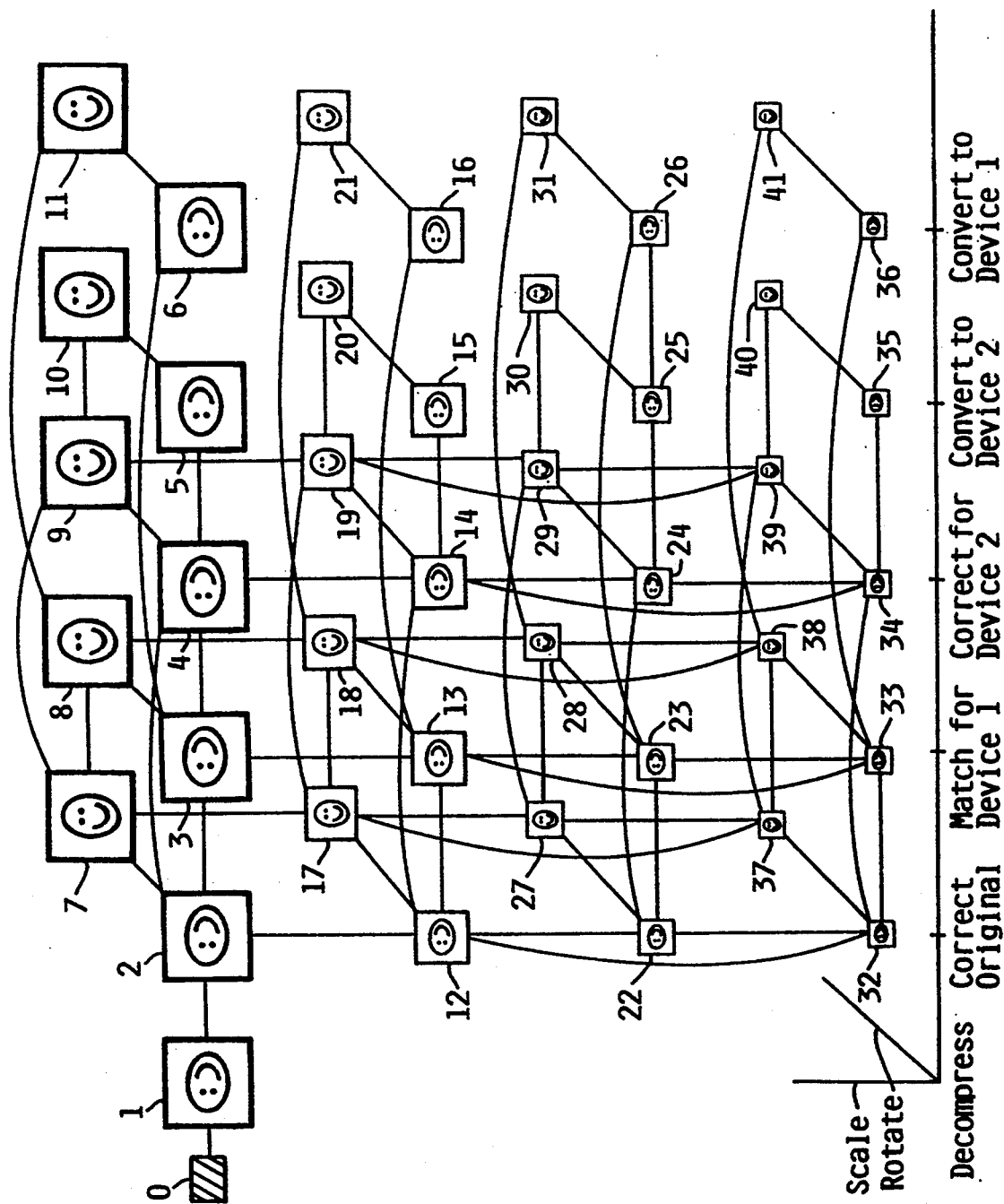
Figure 4C:
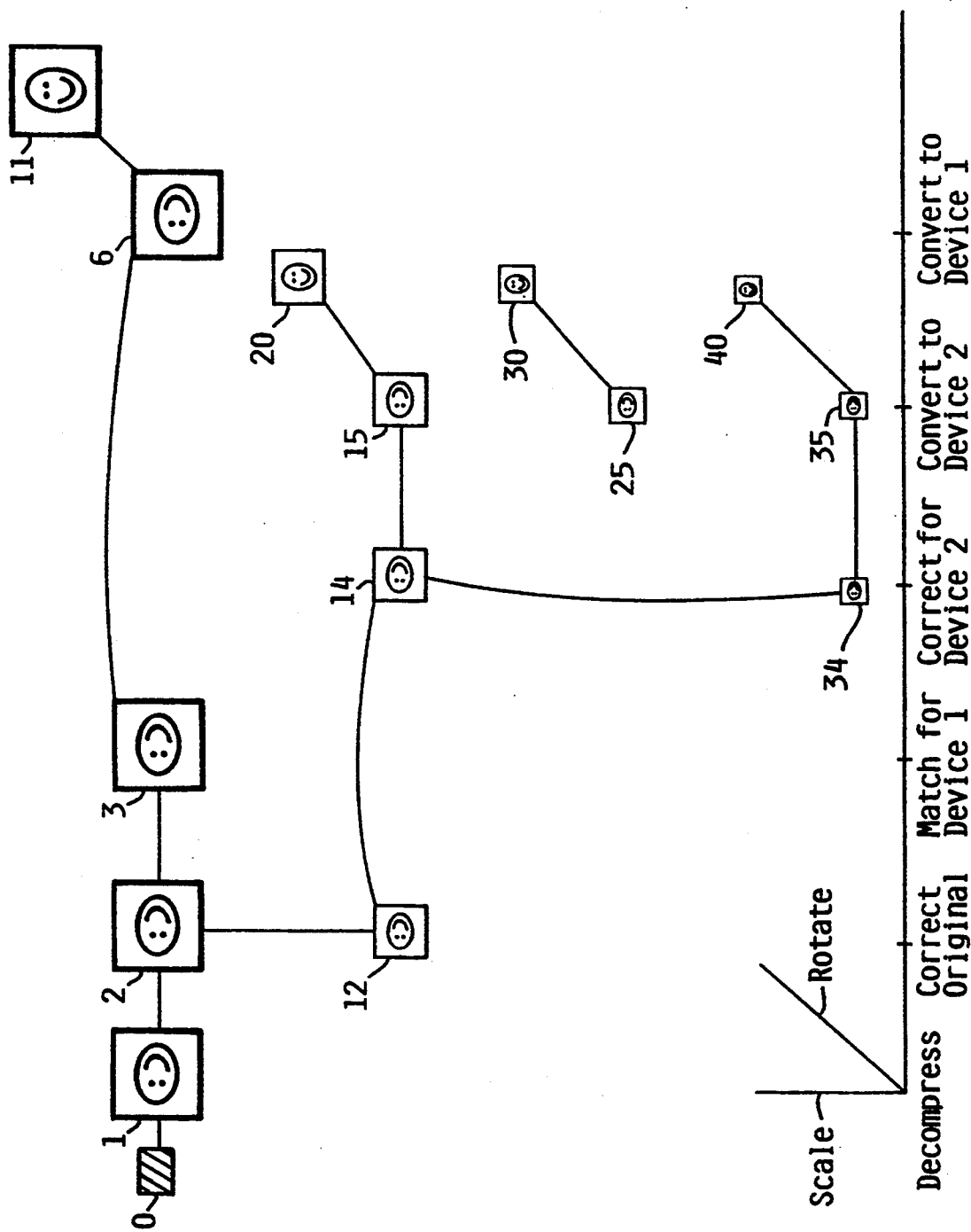

FIGS. 4A–4C show a more complex representation of the generation of a series of images using the method of the invention. FIG. 4A shows existing images 0 and 25, which have already been generated and stored and requested images 11, 20, 30, and 40. The remainder of the images are representations of intermediate images that could be generated, if chosen as part of an optimal path, to produce the requested images. Note that the Y axis of FIG. 4A indicates scaling, the Z axis indicates rotation, and the X axis indicates the rest of the image operations (correct, match, convert) for two different devices.

Each image shown in FIG. 4A represents an image state. As will be described in more detail later, the invention forms a logical connection between each image state that differs from another image state by one operation. For example, image 7 is logically connected to image 37, since image 7 could be scaled to image 37 in one step. It is important to realize at this stage that only image 0 and image 25 actually exist—the requested images have not been generated yet, and the intermediate images will only be generated if the invention determines that they are in an optimal image path.

Figure 8:
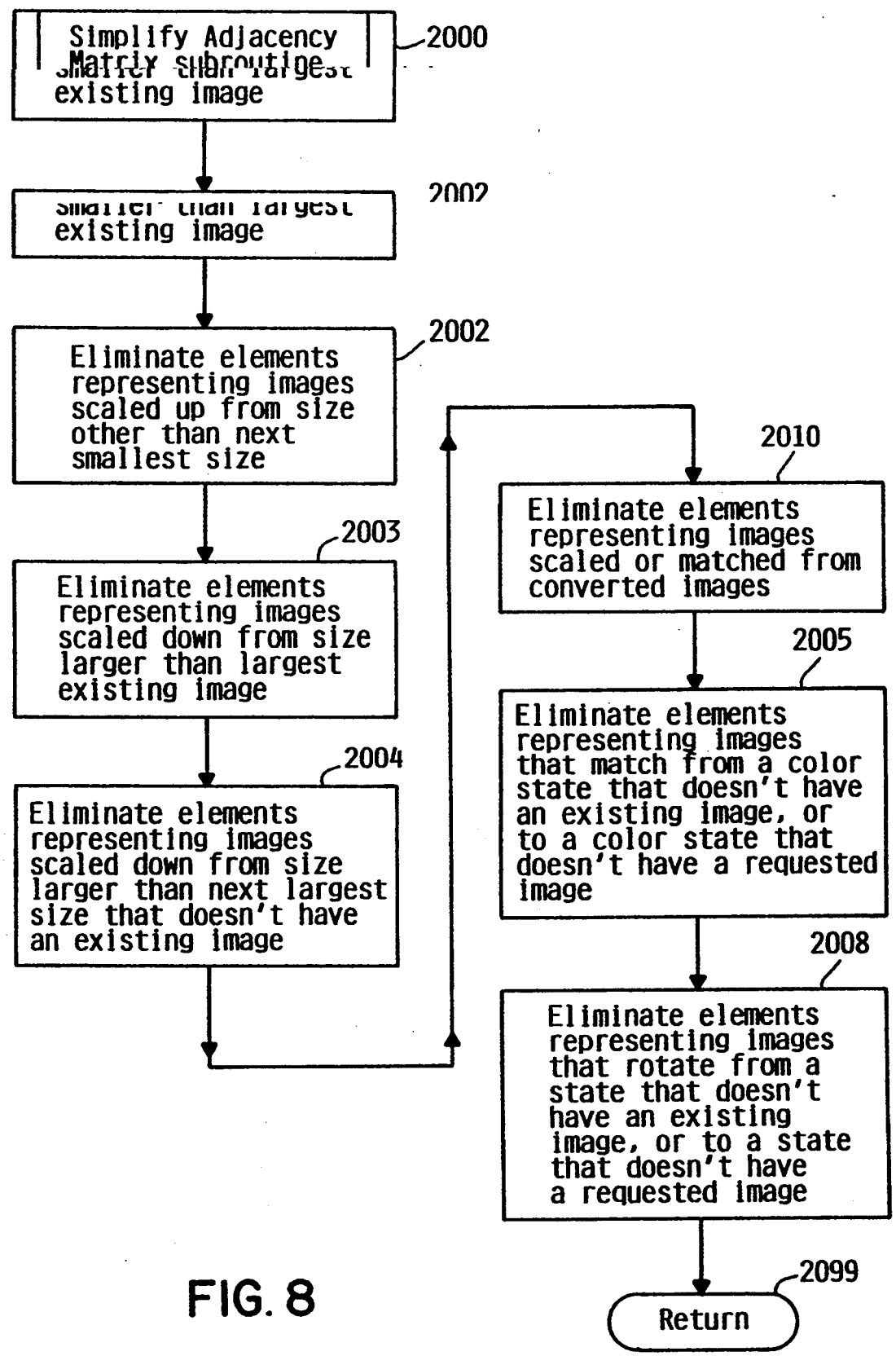

FIG. 4B shows the image states of FIG. 4A after the invention performs a simplification operation on the logical connections between the image states. Logical connections determined to be the result of an inefficient operation have been deleted. For example, although it is true that image 7 could be scaled to image 37 in one step, this is not an efficient operation. Therefore, the connection between images 7 and 37 has been deleted in FIG. 4B. This simplification operation will be explained in more detail later when FIG. 8 is discussed.

FIG. 4C shows the image states of FIG. 4A after the invention has determined the optimal paths to requested images 11, 20, 30, and 40. These paths were determined by forming combinations of paths from existing images to requested images shown in FIG. 4B, and calculating a computational cost for each path combination to determine the best path combination. The optimal path to requested image 11 includes images 0, 1, 2, 3, 6, and 11. The optimal path to requested image 20 includes images 2, 12, 14, 15, and 20. The optimal path to requested image 30 includes images 25 and 30. The optimal path to requested image 40 includes images 14, 34, 35, and 40. After the optimal paths are established, the invention generates requested images 11, 20, 30, and 40 along the optimal paths shown in FIG. 4C. For example, image 20 is generated by scaling intermediate image 2 (resulting in intermediate image 12), matching the color to the second device (resulting in intermediate image 14), converting to the resolution of the second device (resulting in intermediate image 15) and rotating to the orientation desired for requested image 20.

FIGS. 5A-5I show the tables of the invention. Each of these tables is used by the flowcharts of FIGS. 7-11, and will be discussed in more detail later. FIG. 5A shows the Scale State Table. This table keeps track of the unique sizes of the requested images.

FIG. 5B shows the Rotation State Table. This table keeps track of the unique orientations of the requested images. The orientation can be expressed textually, as is shown here, or can use any other representation, such as the TIFF 1-8 representation for orientation known in the art.

FIG. 5C shows the Match State table. Column 510 of this table contains a Color Matrix ID, and refers to a 3×3 color transformation matrix, such as that shown in FIG. 5G. The color matrix converts XYZ values to the RGB tristimulus values of the device. The inverse matrix is multiplied by the linear RGB tristimulus values of a given device state to convert it to standard CIE XYZ tristimulus values. Column 520 contains an ID for a non-linear match table, such as that shown in FIG. 5H. This non-linear transformation table converts linear RGB data to non-linear data to compensate for the nonlinear distortion of a given device. The inverse table transforms the nonlinear data to linear. In the exemplary table in FIG. 5H, the input is a number from 0 to 255 (8 bits), which is used to index into the table which yields a number from 0 to 4095 (12-bits). Therefore this table has 256 values ranging from 0 to 4095. Its inverse table (not shown) would have 4096 values ranging from 0 to 255.

Column 525 of this table shows valid conversion states for each entry in the Match State Table. For example, for an image with a Match State of 3, a conversion state of 2 (i.e. Dither, FIG. 5D) would not be a valid conversion state, since only conversion states 1 and 3 are valid for match state 3.

FIG. 5D shows the Conversion State Table. This table keeps track of the unique conversion techniques used to convert an image to the resolution supported by the device, along with the bytes/pixel representations for the images. Column 530 contains an ID for a non-linear conversion table, such as those shown in FIGS. 5I-5J. FIG. 5I shows a palette normalized luminance table. There are 7 values for red, 8 for green and 4 for blue. The numbers represent the normalized luminance of the red, green and blue components of each palette entry. FIG. 5J shows a dither table. A dither table is a kind of nonlinear transformation table that converts linear data to non-linear device compensated data. It has as input a number from 0 to the maximum value for R, G, or B linear pixel data—in this example, from 0 to 4095. Its output ranges from 0 to the maximum input value to the D/A converters on the display adapter. The difference is that the dither table has not 1 value for each input value but some number greater than 1, where the position of the pixel within the image is used to select between the various output values for the same input value. The exemplary table in FIG. 5J shows 4096 possible input values, ranging from 0 to 4095. The output is one of 4 values for R, 4 values for G, or 4 values for B. The values in this case range from 0 to 31 for R and B, and 0 to 63 for G, since the display adapter takes 5 bits for red and blue and 6 bits for green.

FIG. 5E shows the image table of the invention. This table stores the representation of each existing, requested, and intermediate image. A value of "1" in column 550 indicates that the image exists. A value of "3" indicates an intermediate image, and a value of "2" indicates a requested image. Columns 561-564 refer to the specific row in the scale state table (FIG. 5A), the match state table (FIG. 5C), the rotate state table (FIG. 5B), and the conversion state table (FIG. 5D) that contains the unique value for this image. Column 570 indicates whether the image is compressed or not, and columns 581-583 indicates if various match techniques are used.

FIG. 5F shows the path table of the invention. This table keeps track of the paths found between existing images and requested images. Note that the image sequence stored for each path only includes images that involve a change of state, as represented by the four state tables (FIGS. 5A-5D). For example, path 610 does not include images 1 or 2 in the image sequence between images 0 and 3, since images 1 and 2 are at the same state (with respect to the four state tables) as image 0.

Figures 2, 6A:
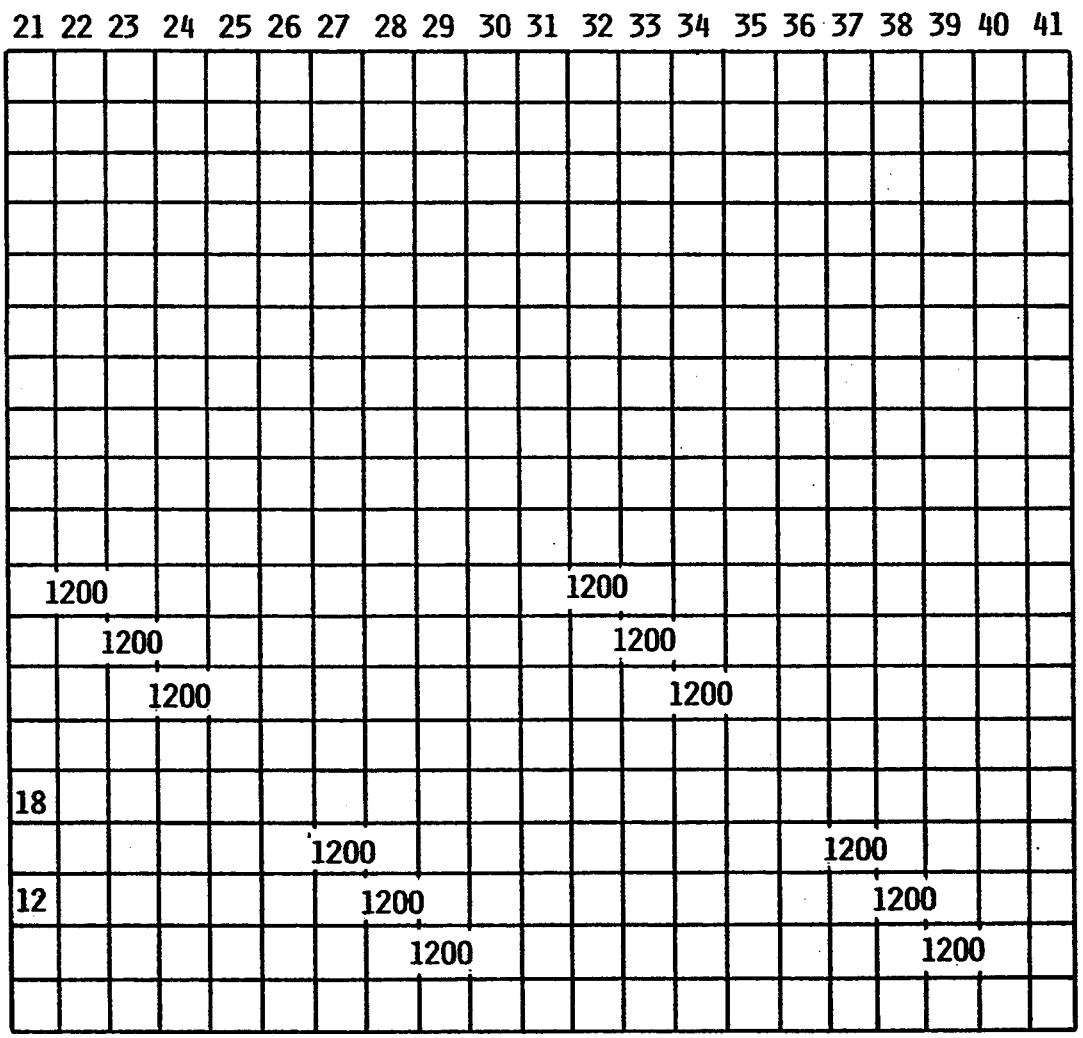
FIGS. 6A–6B show the matrices of image cost and deterioration of the invention.
Figures 3, 6A:
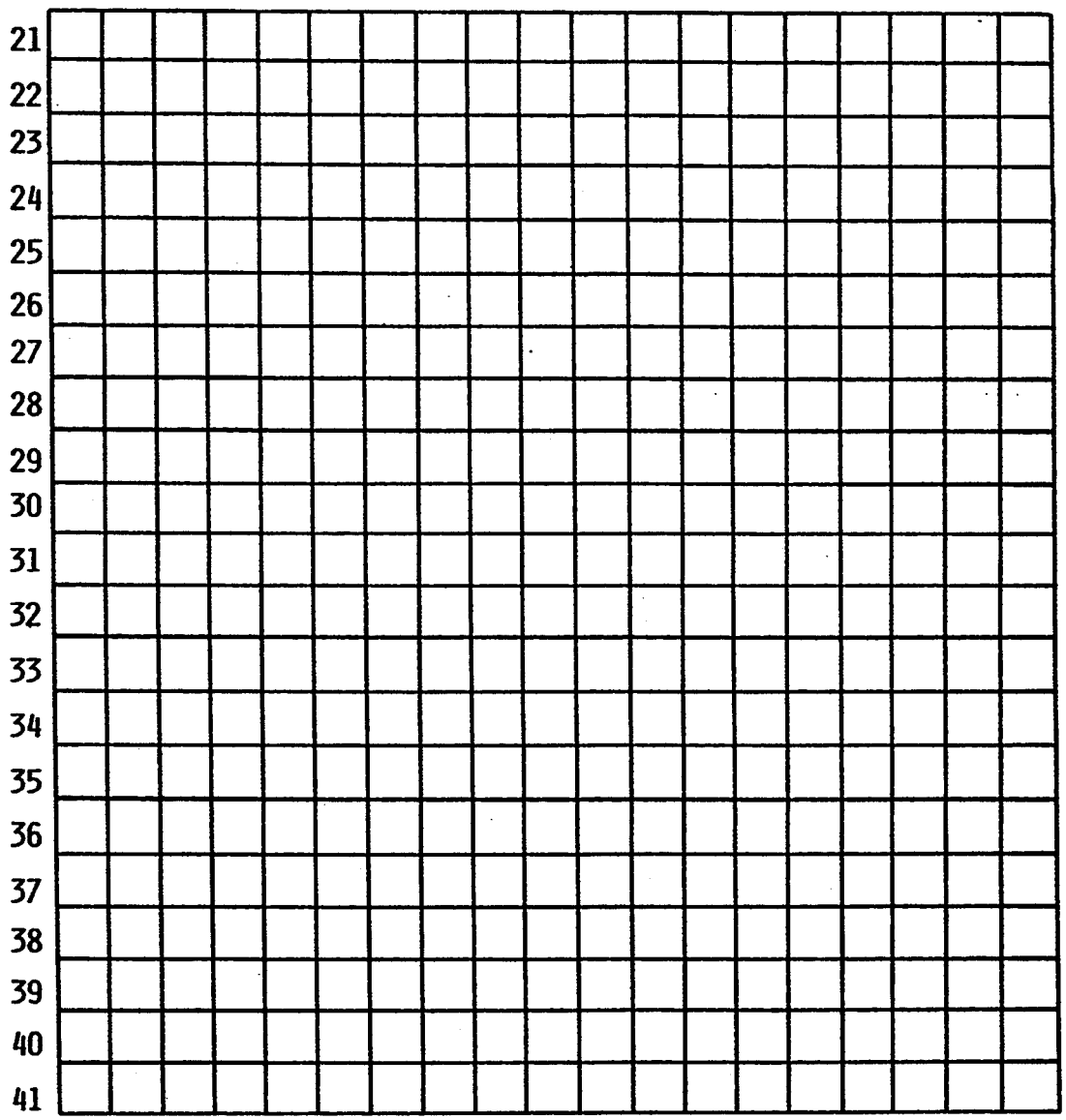
Figures 2, 6B:
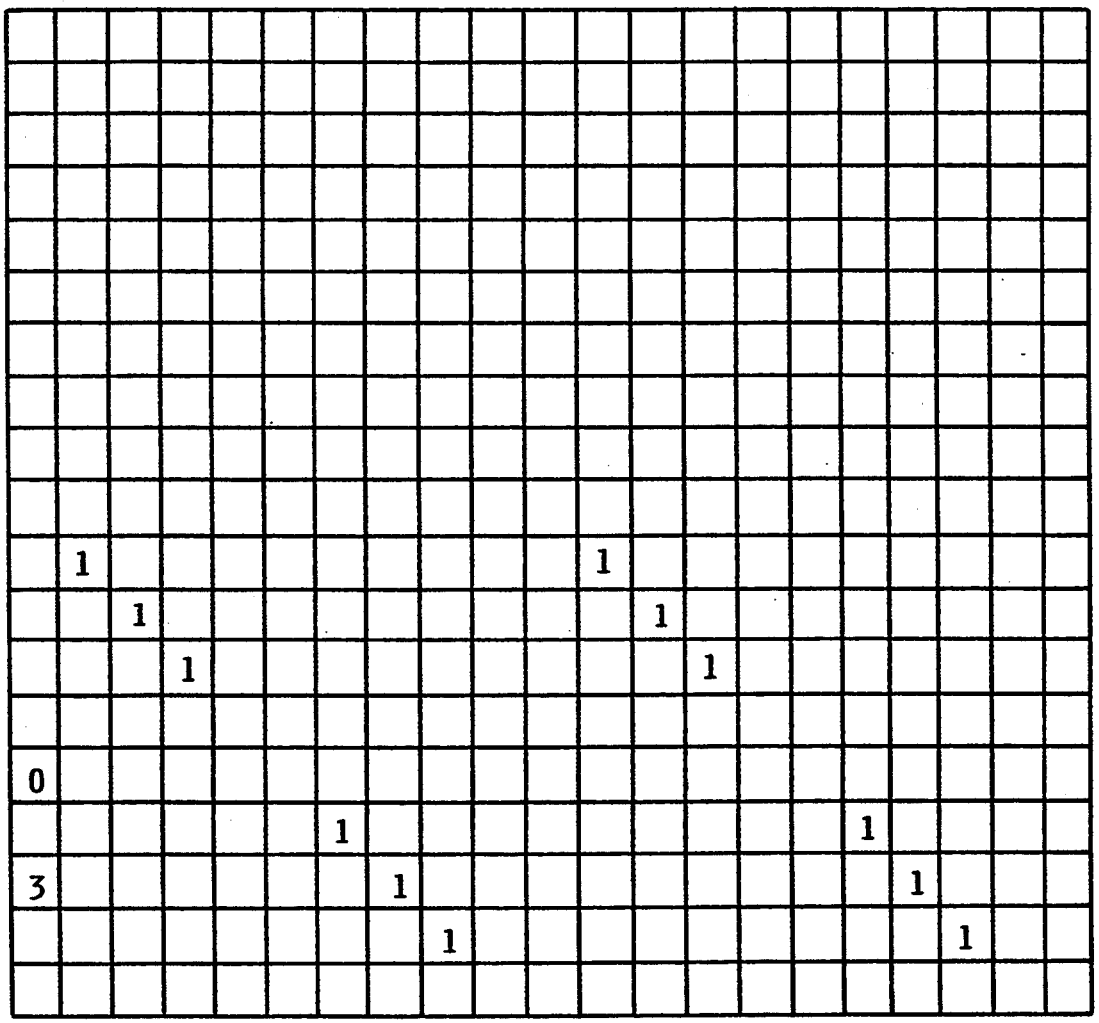
Figures 3, 6B:
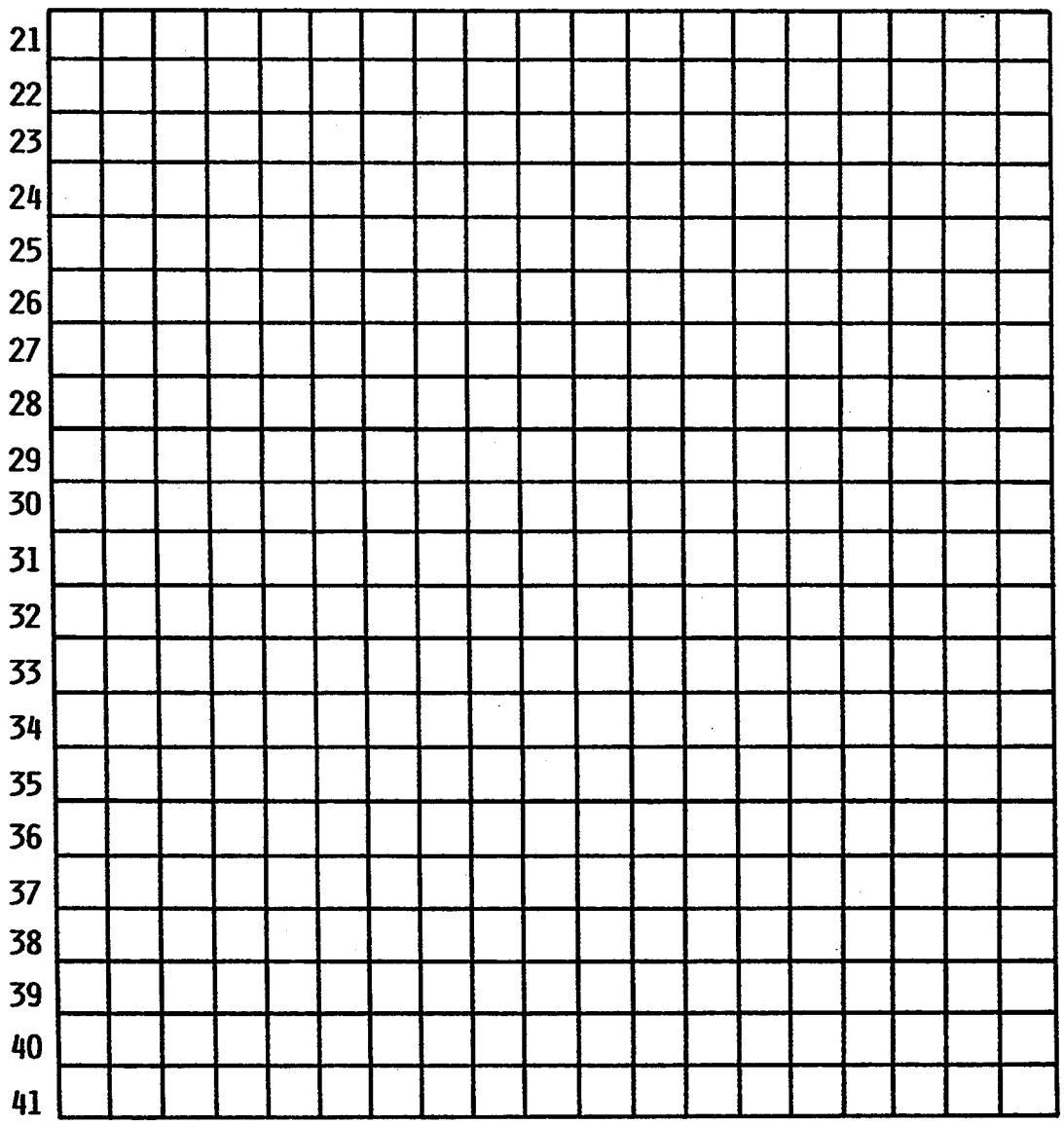

FIGS. 6A-6B show the matrices of the invention. Each of these matrices are used by the flowcharts of FIGS. 7-11, and will be discussed in more detail later. FIG. 6A shows the adjacency matrix of computation costs. There is a row and a column for every possible image. An element in the adjacency matrix represents a logical connection between two images that are one image state apart (i.e. can obtain the column image by performing one image calculation on the row image. This matrix is simplified by the flowchart of FIG. 8 to eliminate elements that represent an inefficient image calculation (such as scaling image 7 to obtain image 37 in FIG. 4A, as has been discussed). FIG. 6B is similar to FIG. 6A, but shows the adjacency matrix for the deterioration value. In the preferred embodiment, a deterioration value from 0-10 is assigned to each image calculation. "0" indicates no deterioration of the image. Since a rotated image does not deteriorate in quality, a value of 0 is assigned for this image calculation. Since a diffusion image calculation substantially deteriorates the image, a deterioration value of 9 is assigned. Note that image 1 and image 2 are not contained in either adjacency matrix since they have the same state as image 0, as has been discussed.

The tables and matrices shown in FIGS. 5A-5I and FIGS. 6A-6B are created by and used by the flowcharts of FIGS. 7-11 to build a network of image paths between one or more existing images and one or more requested images, and then choose an optimal path to each existing image based on computational cost, image deterioration, and/or other criteria. Once the optimal path is chosen, the requested image is calculated by performing the image calculation steps in the optimal path.

Figures 1, 7A:
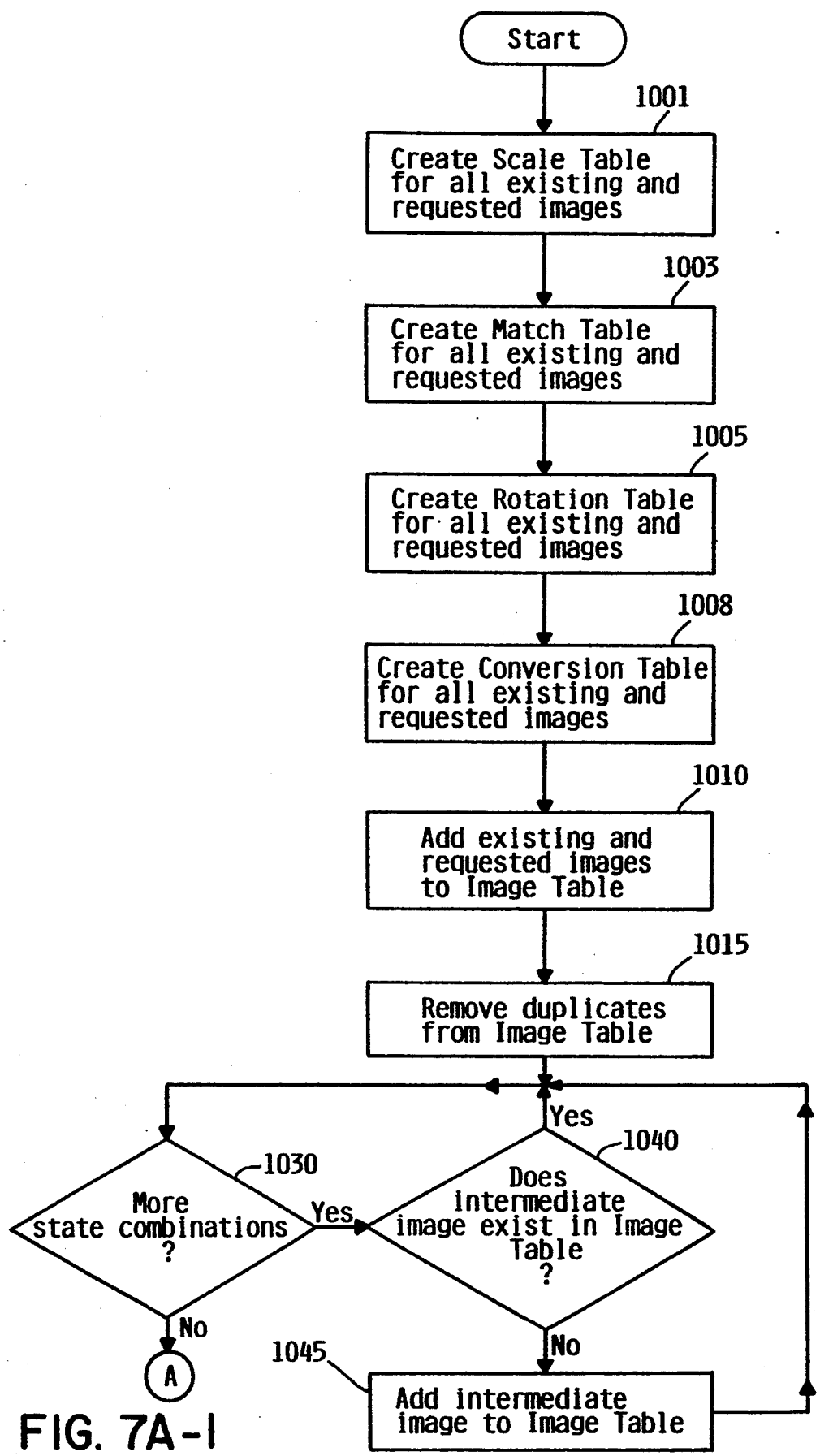
FIGS. 7A–7B, and 8–11 show the flowcharts of the invention.
Figures 2, 7A:
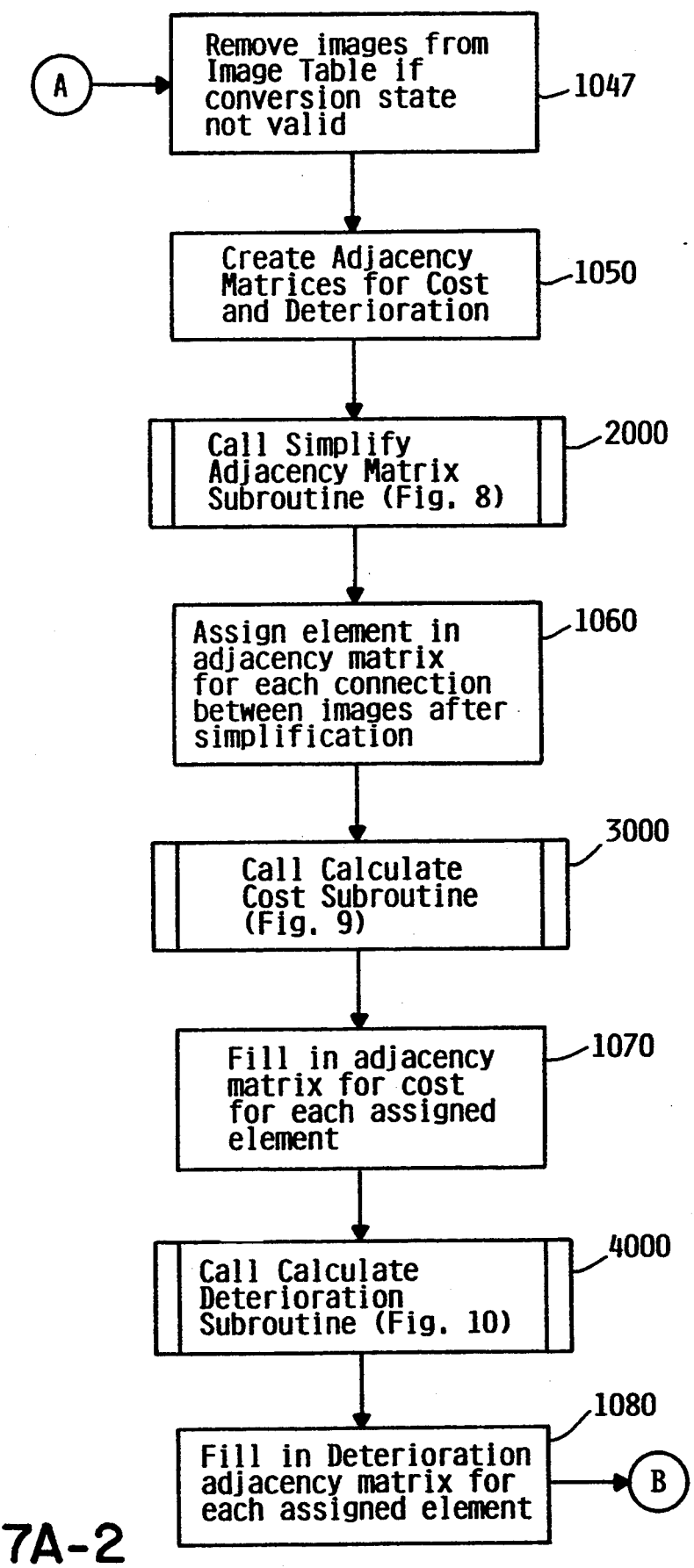

FIGS. 7A-7B, and 8-11 show the flowcharts of the invention. These flowcharts make up image midware 144 (FIG. 1), and are executed on processor 120. The flowchart of FIG. 7A is initiated when a user or application developer requests that one or more images be generated. In the preferred embodiment, users request the generation of images by inputting information into the screen shown in FIG. 12. For the purposes of illustration, we will assume that images 0 and 25 (FIG. 4B) already exist, and the user has requested that images 11, 20, 30, and 40 be generated.

Block 1001 creates a Scale State Table for all existing and requested images, as is shown in FIG. 5A. Block 1003 creates a Match State table for all existing and requested images, as is shown in FIG. 5C. Block 1005 creates a Rotation State Table for all existing and requested images, as is shown in FIG. 5B. Block 1008 creates a Conversion State Table for all existing and requested images, as is shown in FIG. 5D. The data about the existing images used to create the tables in blocks 1001-1008 is normally stored as a header contained in the existing images themselves, stored as images 131 in storage 130 (FIG. 1).

Block 1010 adds the representation of the existing and requested images to the image table, as shown in FIG. 5E. Block 1015 removes any duplicate entries. For example, if image 25 both existed and was requested, block 1015 would remove the entry from the image table that requested this image.

Block 1030 looks to see if there are image state combinations that can be made between the existing images and the requested images. There is one image state combination for each image calculation step corresponding to a state table (FIGS. 5A-5D) that can be made between existing images and requested images. For example, referring to FIG. 4B, image 0 can be used to generate image 11 if it decompressed, corrected to the original color, matched, converted and rotated. Decompression and correction to the original color are not considered to be a change of state in the preferred embodiment, but the remaining three image calculation steps result in block 1030 finding three state combinations. Block 1030 actually finds many more than three state combinations in getting from image 0 to image 11, since there are many other ways (some of them quite inefficient, but possible) to get from image 0 to image 11.

For each state combination found in block 1030, block 1040 asks if the representation of the intermediate image already exists in the image table (FIG. 5E). If not, block 1045 adds the representation for this intermediate image into the image table, and flow of control loops back to block 1030. Blocks 1030, 1040, and 1045 execute until all intermediate images are represented in the image table, at which point block 1030 is answered negatively and flow of control moves to block 1047.

Block 1047 simplifies the Image Table by removing images if the conversion state is not valid. This is determined by comparing the valid conversion states in column 525 of the Match State Table with the state of the conversion in the Conversion Table. Those skilled in the art will appreciate that other rules for removing images could also be executed at this time.

Block 1050 creates the rows and columns for the adjacency matrices shown in FIG. 6A-6B. As discussed above, there is a row and a column in each matrix for all possible images 0-41 that represent the four state tables. Images 1 and 2 are not present in the adjacency matrices, since they have the same states as image 0. Simplify adjacency matrix subroutine 2000 of FIG. 8 is then called. This subroutine eliminates elements representing logical connections between image states determined to be the result of an inefficient operation. Block 2001 eliminates elements representing images scaled up from a size smaller than the largest existing image. Block 2002 eliminates elements representing images scaled up from a size other than the next smallest size. Block 2003 eliminates elements representing images scaled down from a size larger than the largest existing image. Block 2004 eliminates elements representing images scaled down from a size larger than the next largest size that doesn't have an existing image. Block 2010 eliminates elements representing images scaled or matched from converted images, since this creates poor quality images. Block 2005 eliminates elements representing images that match from a color state that doesn't have an existing image, or to a color state that doesn't have a requested image. Likewise, Block 2008 eliminates elements representing images that rotate from a state that doesn't have an existing image, or to a state that doesn't have a requested image. After all these elements are eliminated, the subroutine returns in block 2099 to block 1060 in FIG. 7A. Those skilled in the art will appreciate that more or less steps could be performed in this subroutine, depending on the designer's particular requirements, and still fall within the spirit and scope of this invention.

Figure 9A:
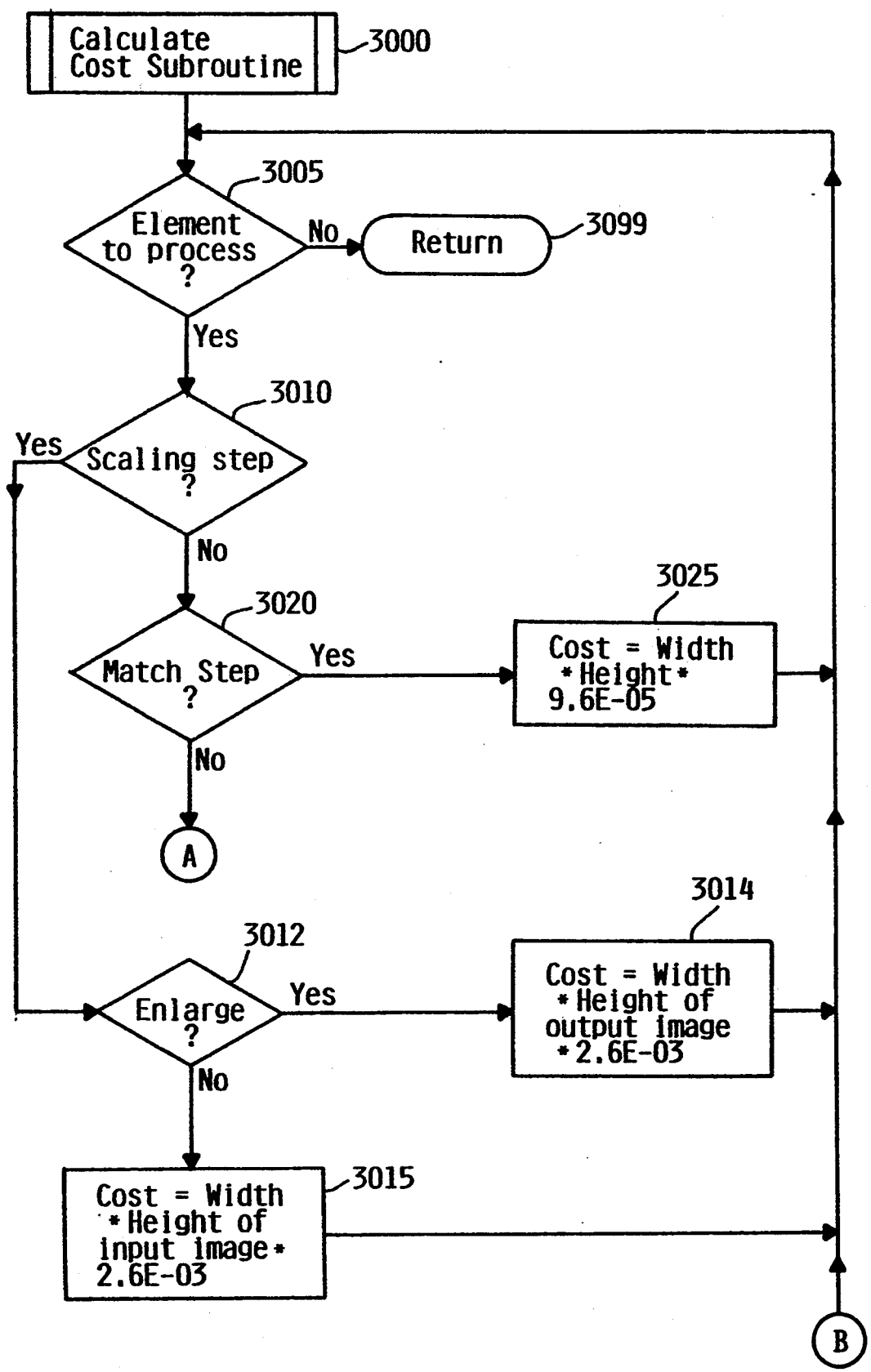
Figure 9B:
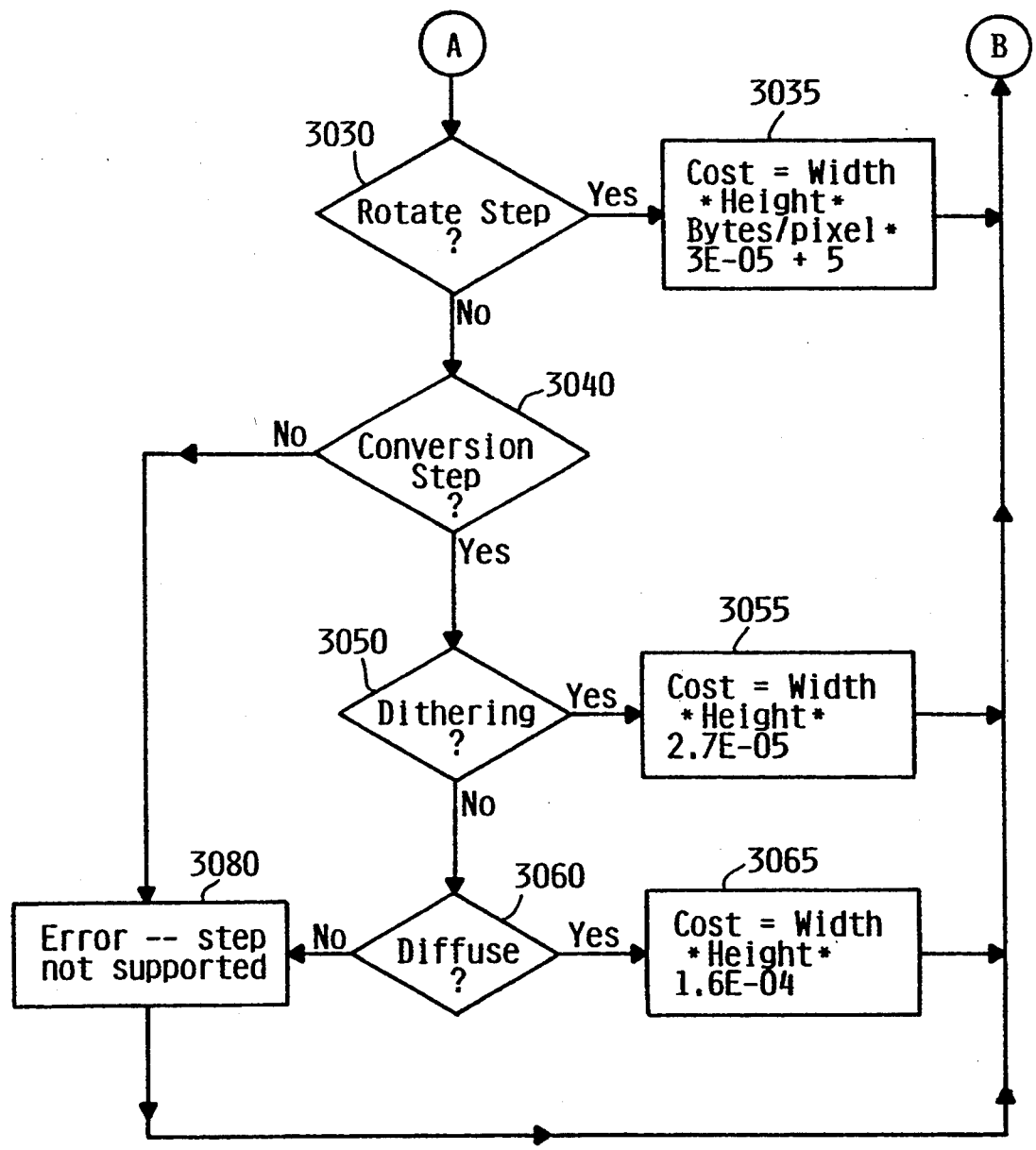

Block 1060 assigns an element in both the cost and deterioration adjacency matrices for each connection between images that survived the elimination operations performed by subroutine 2000, and then calls calculate cost subroutine 3000 of FIG. 9.

Referring now to FIG. 9, block 3005 checks to see if there is an element to process in the cost adjacency matrix. If so, block 3010 asks if this element represents a scaling image calculation step. If so, block 3012 asks if this scaling step enlarges the image. If so, block 3014 assigns a cost equal to the width times the height of the output (i.e. scaled) image, times $2.6 \times 10^{-03}$. If block 3012 is answered negatively, block 3015 assigns a cost equal to the width times the height of the input (i.e. pre-scaled) image, times $2.6 \times 10^{-03}$. In either event, flow of control returns to block 3005. Those skilled in the art will appreciate that the value selected for cost of this and subsequent image calculation steps is a design choice that can be modified and still fall within this invention. Calculation speed, processor utilization, storage utilization, etc., are factors used to determine cost values.

If block 3010 is answered negatively, block 3020 asks if this element represents a match image calculation step. If so, block 3025 assigns a cost equal to the width of the image times the height of the image, times $9.6 \times 10^{-05}$. Flow of control returns to block 3005.

If block 3020 is answered negatively, block 3030 asks if this element represents a rotate image calculation step. If so, block 3035 assigns a cost equal to the width of the image times the height of the image, time the bytes/pixel of the image (found in the conversion state table, FIG. 5D), times $3 \times 10^{-05}$, plus 5. Flow of control returns to block 3005.

If block 3030 is answered negatively, block 3040 asks if this element represents a conversion image calculation step. If so, block 3050 asks if it is a dithering conversion step. If so, block 3055 assigns a cost equal to the width of the image times the height of the image, times $2.7 \times 10^{-05}$. Flow of control returns to block 3005.

If block 3050 is answered negatively, block 3060 asks if this element represents a diffusion conversion image calculation step. If so, block 3065 assigns a cost equal to the width of the image times the height of the image, times $1.6 \times 10^{-04}$. Flow of control returns to block 3005. If blocks 3040 or 3060 are answered negatively, an error has occurred, and block 3080 posts an error message. After block 3005 has processed all the elements in the cost adjacency matrix (after simplification), the subroutine returns in block 3099 to block 1070 in FIG. 7A.

Figure 10A:
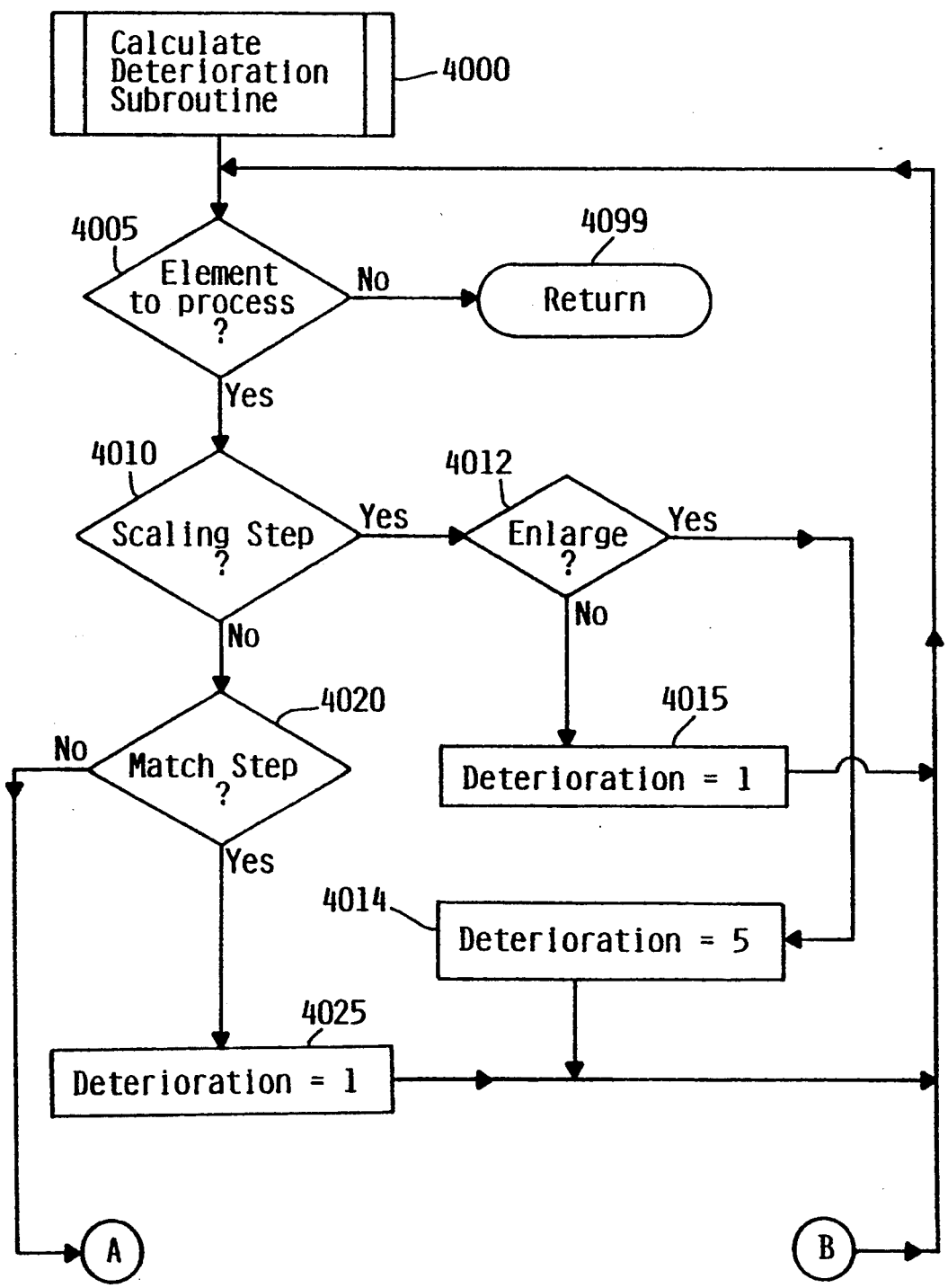
Figure 10B:
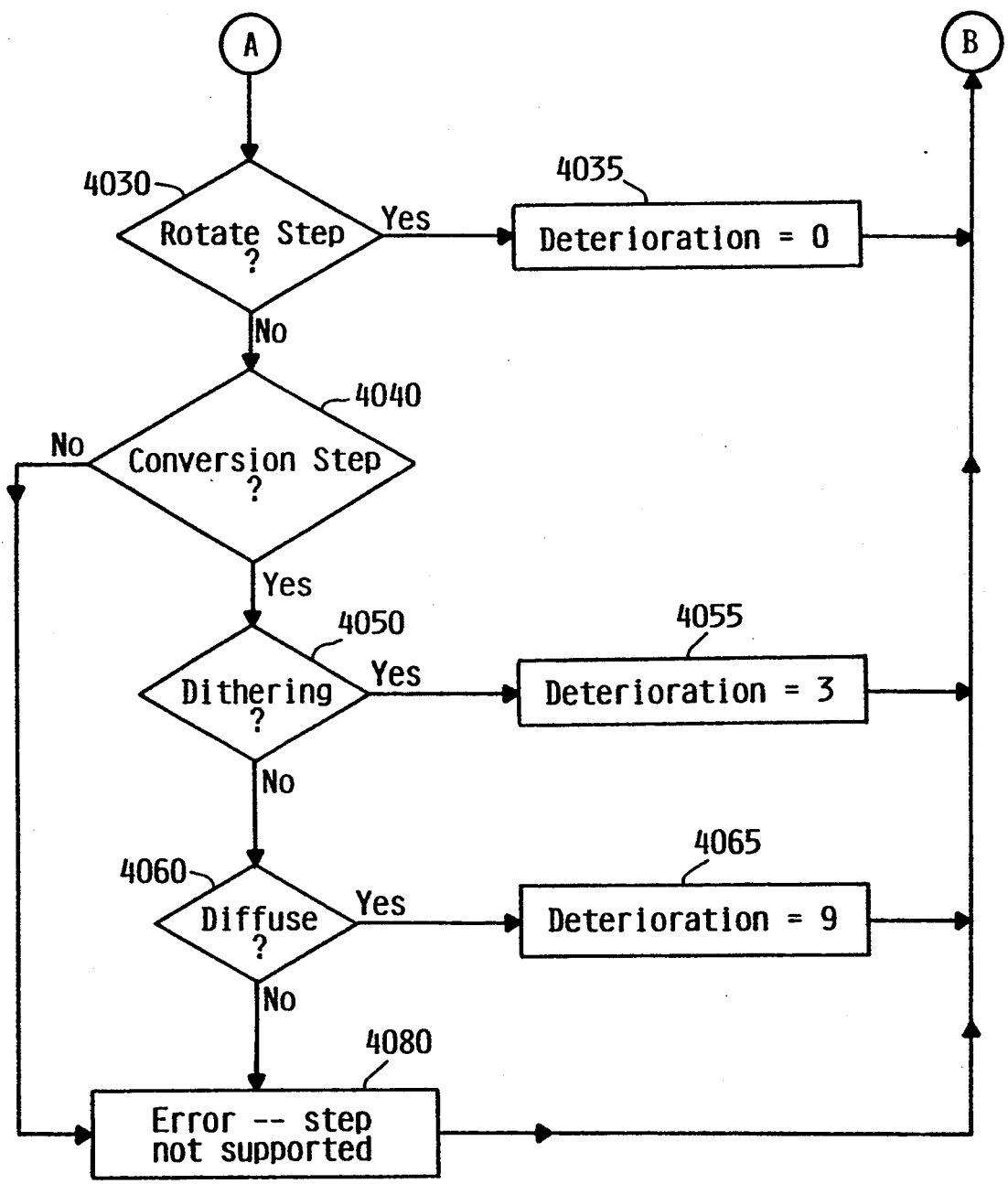

Referring again to FIG. 7A, block 1070 fills in the adjacency matrix for cost for each assigned element determined by subroutine 3000, as is shown in FIG. 6A, and calls calculate deterioration subroutine 4000 in FIG. 10.

Referring now to FIG. 10, block 4005 checks to see if there is an element to process in the deterioration adjacency matrix. If so, block 4010 asks if this element represents a scaling image calculation step. If so, block 4012 asks if this scaling step enlarges the image. If so, block 4014 assigns a deterioration value =5. If block 4012 is answered negatively, block 4015 assigns a deterioration value equal to 1. In either event, Flow of control returns to block 4005. Those skilled in the art will appreciate that the value selected for deterioration value of this and subsequent image calculation steps is a design choice that can be modified and still fall within this invention.

If block 4010 is answered negatively, block 4020 asks if this element represents a match image calculation step. If so, block 4025 assigns a deterioration value equal to 1. Flow of control returns to block 4005.

If block 4020 is answered negatively, block 4030 asks if this element represents a rotate image calculation step. If so, block 4035 assigns a deterioration value equal to 0. Flow of control returns to block 4005.

If block 4030 is answered negatively, block 4040 asks if this element represents a conversion image calculation step. If so, block 4050 asks if it is a dithering conversion step. If so, block 4055 assigns a deterioration value equal to 3. Flow of control returns to block 4005.

If block 4050 is answered negatively, block 4060 asks if this element represents a diffusion conversion image calculation step. If so, block 4065 assigns a deterioration value equal to 9. Flow of control returns to block 4005. If blocks 4040 or 4060 are answered negatively, an error has occurred, and block 4080 posts an error message. After block 4005 has processed all the elements in the deterioration value adjacency matrix (after simplification), the subroutine returns in block 4099 to block 1080 in FIG. 7A.

Figures 1, 7B:
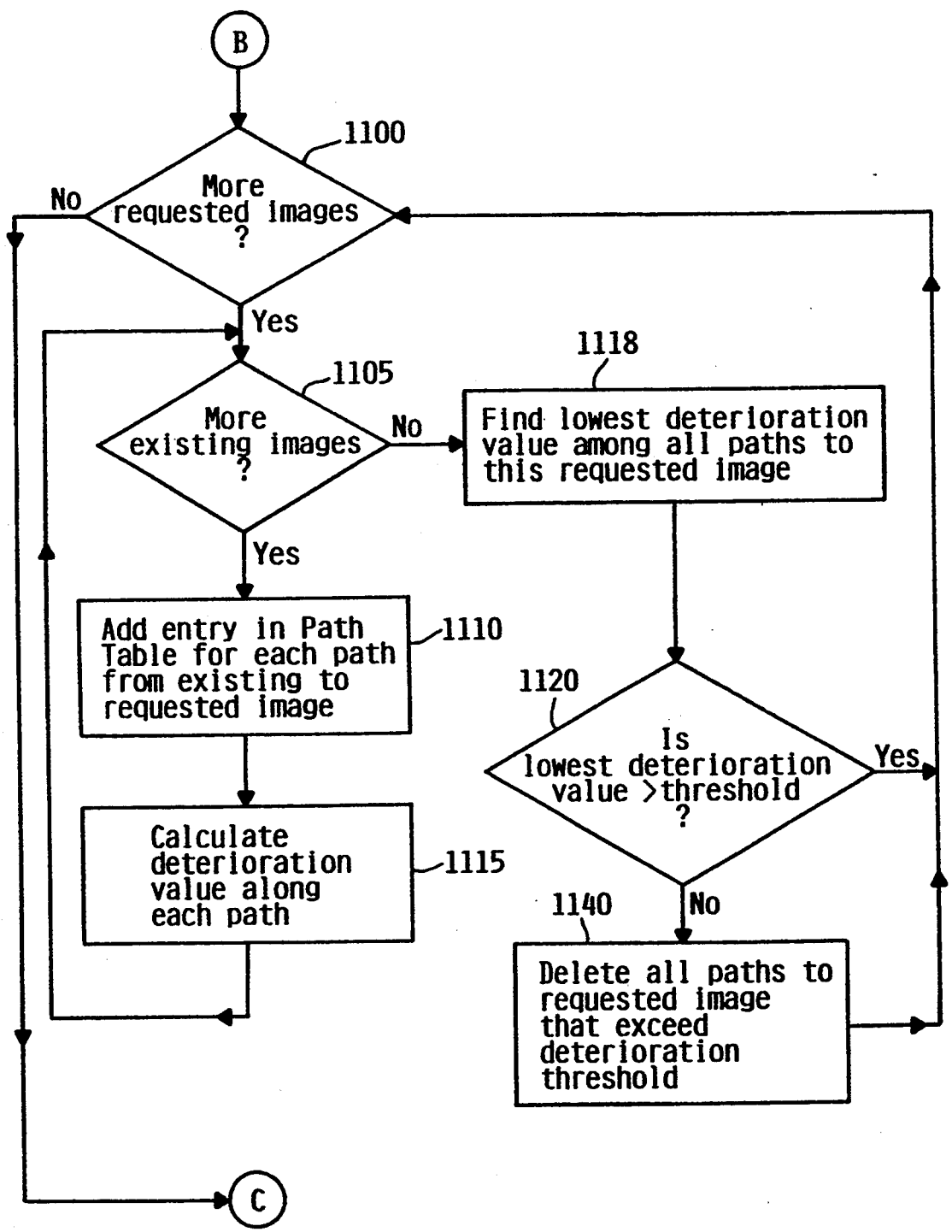
Figures 2, 7B:
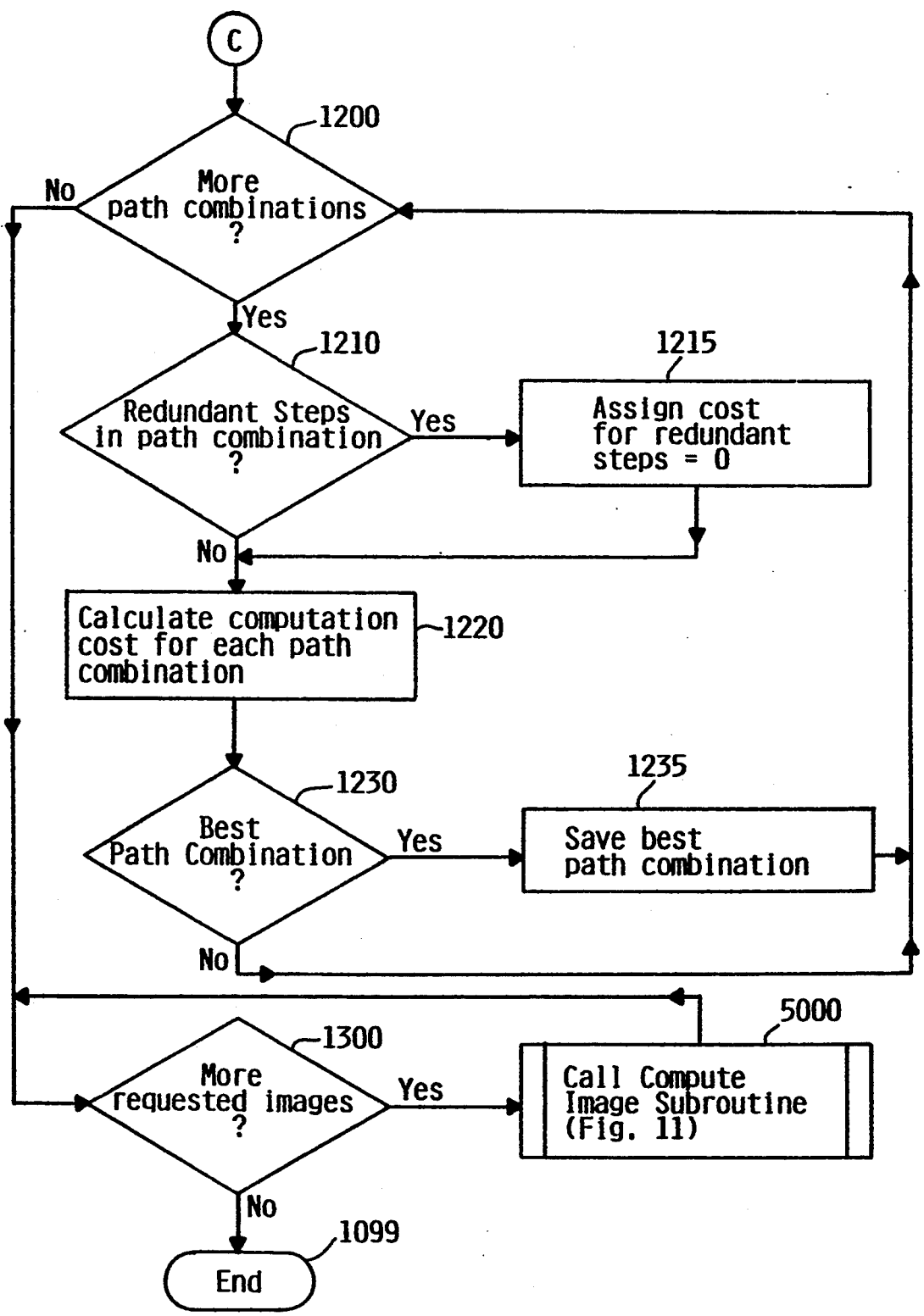

Block 1080 assigns an element in the deterioration adjacency matrix for each connection between images that survived the elimination operations performed by subroutine 2000, and flow of control moves to block 1100 of FIG. 7B.

Referring now to FIG. 7B, block 1100 asks if there are more requested images to process. If so, block 1105 asks if there are more existing images to process. If so, block 1110 adds an entry in the path table (FIG. 5F) for each path found from this existing image to this requested image. This is done by taking each branch of the tree formed in the adjacency matrix between the existing image and the requested image. For example, the first path found to requested image 11 from existing image 0 is through image sequence 0, 7, 8, and 11 (see FIG. 4B).

Once all path entries have been determined, block 1115 adds up the deterioration values from the deterioration adjacency matrix for each path entry in this path, and stores this information in the path table. The deterioration value for existing images is stored in the header associated with the image, and is included in this calculation. Flow of control loops back to block 1005 to look for more existing images to match to this requested image. If more existing images are found, additional paths are added to the path table by looping through blocks 1005, 1110, and 1115.

Once block 1105 is answered negatively, block 1118 finds the path with the lowest deterioration value among all paths found to this requested image. This is done by looking at the total deterioration value for each path stored in the path table. Block 1120 asks if this path with the lowest deterioration value exceeds a deterioration threshold. This threshold can be specified by the user, such as is done in the screen of FIG. 12, or be preset and hardcoded into block 1120. The deterioration threshold indicates a minimum level of acceptable image quality. If the path with the lowest deterioration threshold does not exceed the deterioration threshold, at least one path exists that meets the quality requirements determined by the deterioration threshold. Block 1120 is answered negatively, and block 1140 deletes all paths to the requested image from the path table that exceed the deterioration threshold. If block 1120 is answered affirmatively, no paths meet the quality requirements, so none are deleted. In either event, flow of control returns to block 1100 to look for another requested image. Once all requested images have been processed, block 1100 is answered negatively, and flow of control moves to block 1200.

Block 1200 looks to see if combinations can be made between paths for each image. For example, block 1200 first discovers that paths 1 of images 11, 20, 30, and 40 (FIG. 5F) form one path combination. Block 1210 checks to see if there are any redundant steps in the path combination. Since our current path combination has a redundant step in the image sequence 0–12, block 1210 is answered affirmatively, and block 1215 assigns a cost for each of the redundant steps =0. Block 1220 then calculates the computation cost for each path combination. This is done by summing the cost value from the cost adjacency matrix for each image sequence in the combined path, keeping in mind that redundant steps identified in blocks 1210–1215 have a cost of 0.

Block 1230 asks if this path is the best path combination found so far. Since it is the first path combination found so far, block 1230 is answered affirmatively, and block 1235 saves this best path combination. Flow of control loops back to block 1200 to look for more path combinations. Blocks 1200–1235 are executed repeatedly, looking for the best path combination. When all path combinations are exhausted, block 1200 is answered negatively, and the paths that make up the best path combination last saved in block 1235 are considered to be the optimal paths. In our example of FIG. 4B and FIG. 5F, paths 610, 620, 630, and 640 are determined to be the optimal paths to images 11, 20, 30, and 40, respectively.

Once the optimal paths are determined, it is time to actually compute the requested images, by performing each image calculation step along the optimal path from the existing image to the requested image. It is important to note that the each individual image calculation used by this invention is itself a conventional technique well known to those skilled in the art. The following are exemplary references publicly known to those of skill in the art that describe one or more image calculation steps:

1. G. Goertzel and G. R. Thompson, "'Halftoning' Techniques for Displaying Images with a Limited Color Palette," Electronic Imaging West '90, Pasadena, Calif.
2. Fred Mintzer and John D. McFall, "Organization of a system for managing the text and images that describe an art collection," Proceedings of the "Image Handling and Reproduction Systems Conference" of the 1991 IS&T International Symposium on Electronic Imaging, San Jose, 26 Feb. 1991.
3. H. R. Delp, G. Goertzel, J. C. Lee, F. C. Mintzer, G. R. Thompson, H. S. Wong, "Color Properties and Color Calibration for a High-performance, High-Fidelity Color Scanner," Proceedings of the "Symposium on Electronic Photograph" of the IS&T's 44th Annual Conference, 12–17 May, 1991.
4. Two-Dimensional Signal and Image Processing, Jae S. Lim, Prentice Hall, 1990, Chapter 8 "Image Enhancement" has a section on Contrast and Dynamic Range modification that is the general technique of correcting the original. Chapter 4 has general techniques related to scaling. ISBN 0-13-935322-4.

Figure 11A:
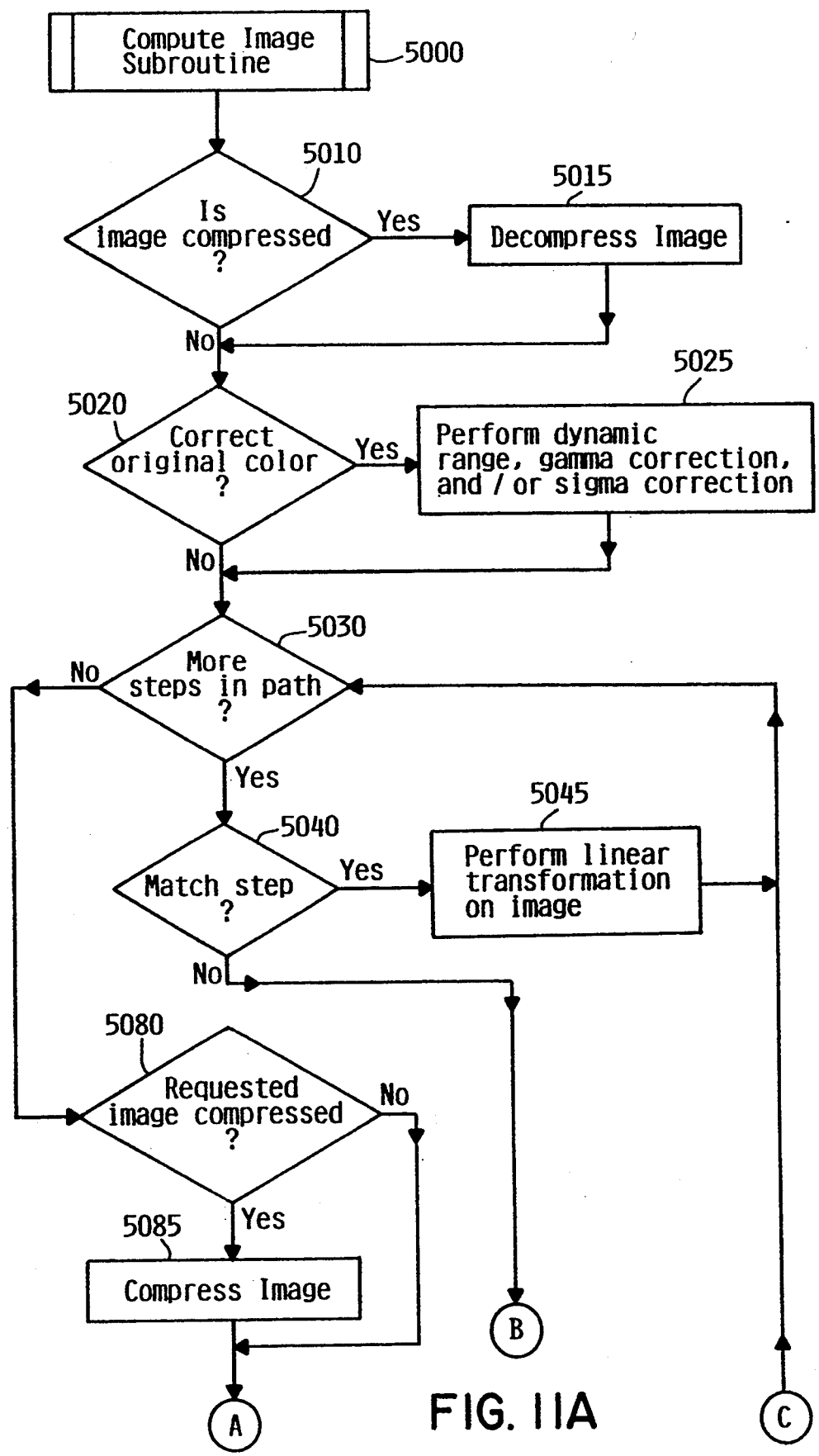
Figure 11B:
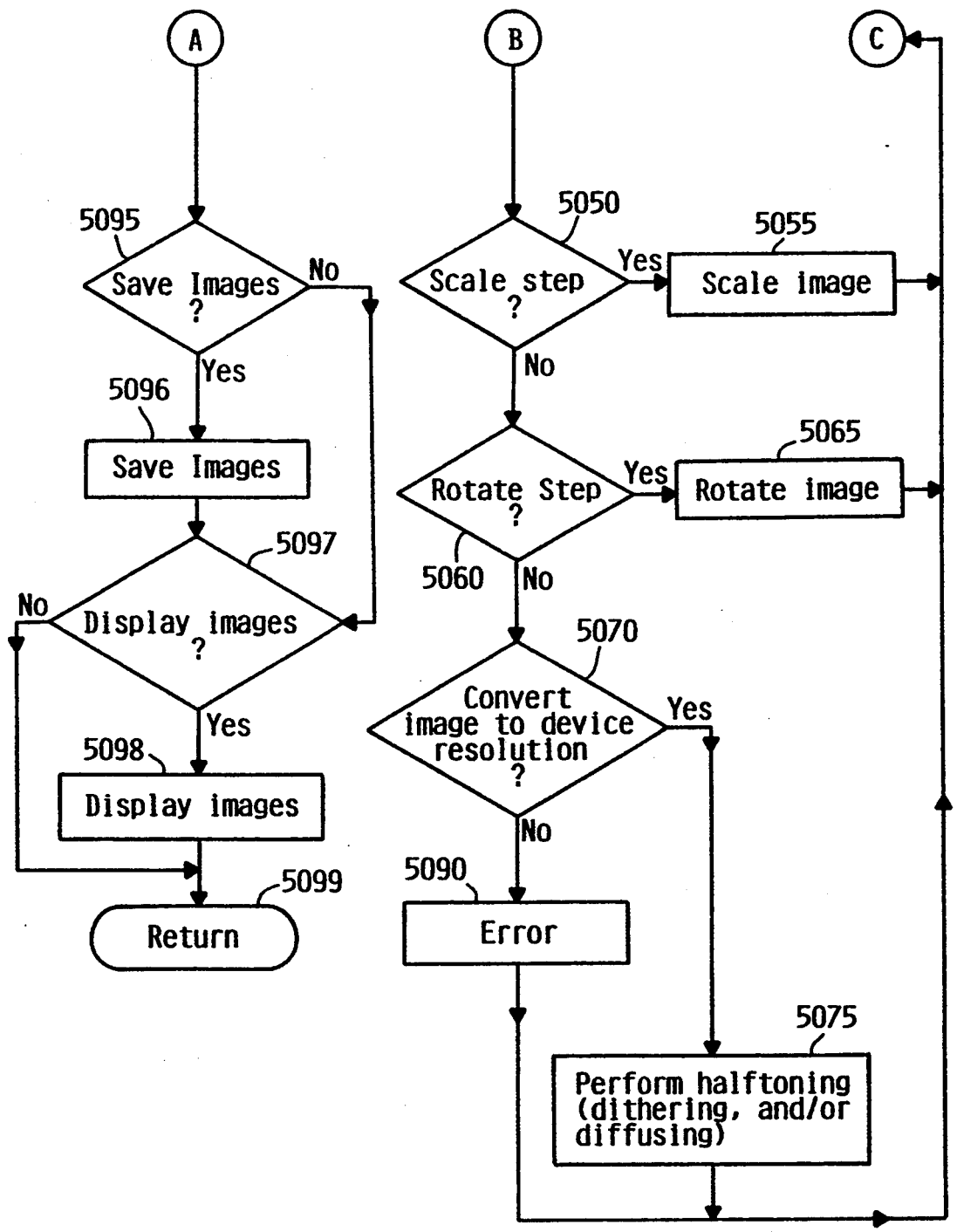

Block 1300 checks to see if there are any more requested images to compute. If so, compute image subroutine 5000 of FIG. 11 is called. Referring now to FIG. 11, block 5010 checks column 570 in the image table (FIG. 5E) to see if the image is compressed. If so, block 5015 decompresses the image in a conventional manner. In either event, block 5020 then checks to see if the original color of the image needs to be corrected by looking at columns 581–583 in the image table (FIG. 5E). If so, the correction of the original color is performed using the conventional match techniques of dynamic range, gamma correction, and/or sigma correction. In either event, block 5030 checks to see if there are more steps in the optimal path. If so, block 5040 checks to see if the step in the optimal path is a match step. If so, block 5045 performs a conventional match transformation (i.e. linear transformation) computation, and loops back to block 5030.

If block 5040 is answered negatively, block 5050 checks to see if the step in the path is a scale step. If so, block 5055 scales the image in a conventional manner, and loops back to block 5030. If block 5050 is answered negatively, block 5060 checks to see if the step in the path is a rotate step. If so, block 5065 rotates the image in a conventional manner, and loops back to block 5030. If block 5060 is answered negatively, block 5070 checks to see if the step in the path is a conversion step. If so, block 5075 performs halftoning (i.e. dithering, error-diffusing) on the image in a conventional manner, and loops back to block 5030.

If block 5070 is answered negatively, block 5090 posts an error condition for this step and loops back to block 5030. Once all the image calculation steps in the optimal path have been performed, block 5030 is answered negatively, and block 5080 checks the image table to see if the requested image is compressed. If so, block 5085 compresses the image in a conventional manner. In either event, block 5095 determines whether the existing and/or intermediate images are to be saved. If so, the images are saved to image storage area 131 (FIG. 1) in block 5096. Block 5097 then checks to see if the images should be displayed. If so, the image(s) are displayed in block 5098 on display 170 (FIG. 1). In either event, the subroutine returns in block 5099 to block 1300 in FIG. 7B. Once all images have been calculated, the program ends in block 1099.

An alternate embodiment has been contemplated that simplifies the method and apparatus disclosed in the preferred embodiment. In this alternate embodiment, the image path network is built by using simplifying rules which order the image calculation steps according to cost. In this embodiment, the path table is replaced by a tree structure, where various image calculation steps are branches in the tree. The adjacency matrices are replaced by rules.

In this alternate embodiment, all requested images are associated with the best and most economical existing image in a simple tree structure, with one root (existing image) and many equal leaves (the requested images). For example, each requested image might be attached to the smallest existing image larger than itself. All images from the branch point are then sorted and grouped according to the image state that has the highest image calculation cost (e. g. scaling). For each group, an intermediate image is created to be the node of the group of images and is inserted into the tree. Each sub group is then sorted and grouped by the image state with the next highest image calculation cost. An intermediate image is created and inserted to be the node for this group. These steps are repeated for each image state. The tree is then traversed, and additional intermediate images are added for image calculation steps which take more than one operation. The images would be created by executing the image calculation steps defined within the tree.

While this invention has been described with respect to the preferred and alternate embodiments, it will be understood by those skilled in the art that various changes in detail may be made therein without departing from the spirit, scope and teaching of the invention. For example, the number and type of image calculation steps performed is highly dependent on the requirements and resources of a particular application. Examples of other image calculation steps that could be performed are small angle rotation, preparation of images for printing as well as display, edge enhancement, and negative to positive conversion. The techniques for determining the cost and deterioration of image calculation are also highly dependent on the requirements and resources of a particular application, as are the techniques for simplifying the adjacency matrices and the image table. In addition, an image path network can be built using a variety of techniques beyond the tables and matrices of the preferred embodiment, and beyond the tree structure of the alternate embodiment. For example, the image path network could also be built using geometric techniques and exhaustive search techniques. Accordingly, the herein disclosed is to be limited only as specified in the following claims.

What is claimed is:

1. A method for the efficient generation of a first requested image and a second requested image from an existing image through a plurality of images states, wherein each image comprises a plurality of variable parameters and wherein each image state comprises an image having specified values for each of said variable parameters, said method comprising the machine executed steps of:

adding a representation of said first requested image to an image table;

adding a representation of said second requested image to an image table;

adding a representation of said existing image to said image table;

adding representations of a plurality of intermediate images to said image table, each of said representations of a plurality of intermediate images corresponding to a change of an image state between said existing image and said first or second requested images;

building a plurality of first image paths between said existing image and said first requested image, each image path comprising a computational step required for conversion of a selected image state to an alternate image state;

building a plurality of second image paths between said existing image and said second requested image;

combining image paths in said plurality of first image paths with image paths in said plurality of second image paths, resulting in a plurality of combined image paths;

calculating a computational complexity for each of said combined image paths;

choosing a first optimal image path between said existing image and said first requested image, and a second optimal image path between a second intermediate image and said second requested image, responsive to said calculating step, said first optimal image path including a first subset of intermediate images, said second optimal image path including a second subset of intermediate images;

generating said first requested image as determined by said first optimal image path; and generating said second requested image as determined by said second optimal image path.

2. The method of claim 1, further comprising the step of:

displaying said first requested image on a computer display screen.

3. The method of claim 2, further comprising the step of:

saving said first requested image on a computer storage device.

4. The method of claim 3, further comprising the step of:

saving said first subset of intermediate images on said computer storage device.

5. The method of claim 1, further comprising the step of:

calculating an image deterioration value for said plurality of image paths;

eliminating any image path from said plurality of image paths that exceeds a threshold image deterioration value.

6. The method of claim 5, wherein said eliminating step is executed only if there is at least one image path that does not exceed said threshold image deterioration value.

7. The method of claim 1, wherein said building steps are optimized to exclude inefficient image paths.

8. The method of claim 1, wherein said generating said first requested image step further comprises the step of:

decompressing said existing image, resulting in a first intermediate image.

9. The method of claim 8, wherein said generating said first requested image step further comprises the step of:

scaling said first intermediate image, resulting in said second intermediate image.

10. The method of claim 9, wherein said generating said first requested image step further comprises the step of:

correcting the original color of said second intermediate image, resulting in a third intermediate image.

11. The method of claim 10, wherein said generating said first requested image step further comprises the step of:

matching the corrected color of said third intermediate image to the representation of color in a first device, resulting in a fourth intermediate image.

12. The method of claim 11, wherein said generating said first requested image step further comprises the step of:

converting said fourth intermediate image to a fifth intermediate image having a resolution supported by said first device.

13. The method of claim 12, wherein said generating said first requested image step further comprises the step of:

rotating the fifth intermediate image to an orientation of said first requested image, resulting in said first requested image.

14. The method of claim 13, wherein said generating said second requested image step further comprises the step of:

matching the corrected color of said third intermediate image to the representation of color in a second device, resulting in a sixth intermediate image.

15. The method of claim 14, wherein said generating said second requested image step further comprises the step of:

converting said sixth intermediate image to a seventh intermediate image having a resolution supported by said second device.

16. The method of claim 15, wherein said generating said second requested image step further comprises the step of:

rotating the sixth intermediate image to an orientation of said second requested image, resulting in said second requested image.

17. A method for the efficient generation of a requested image from an existing image through a plurality of images states, wherein each image comprises a plurality of variable parameters and wherein each image state comprises an image, having specified values for each of said variable parameters, said method comprising the machine executed steps of:

adding a representation of said requested image to an image table;

adding a representation of said existing image to said image table;

adding representations of a plurality of intermediate images to said image table, each of said representations of a plurality of intermediate images corresponding to a change of an image state between said existing image and said first requested image;

building a plurality of image paths between said existing image and said first requested image each image path comprising a computational step required for conversion of a selected image to an alternate image;

calculating a computational complexity for each of said plurality of image paths;

choosing an optimal image path between said existing image and said requested image responsive to said calculating step, said optimal image path including a first subset of intermediate images;

generating said requested image as determined by said optimal image path.

18. A method for the efficient generation of a requested image from an existing image, wherein each image comprises a plurality of variable parameters, said method comprising the machine executed steps of:

determining a plurality of intermediate images between said requested image and said existing image;

building an image path network of representations of a plurality of image paths from said requested image to said existing image, each image path comprising a computational step required for conversion Of a first image to an alternate image, said image path network including representations of a said plurality of intermediate images;

calculating a deterioration value for each of said plurality of image paths;

choosing an optimal image path between said existing image and said requested image responsive to said calculating step, said optimal image path including a first subset of intermediate images; and generating said requested image as determined by said optimal image path.

19. A computer system for generating a requested image from an existing image, wherein each image comprises a plurality of variable parameters, said computer system comprising:

means for determining a plurality of intermediate images between said requested image and said existing image;

means for building an image path network of representations of a plurality of image paths from said requested image to said existing image, each image path comprising a computational step required for conversion of a selected image to an alternate image, said image path network including representations of said plurality of intermediate images;

means for calculating a computational complexity for each of said plurality of image paths;

means for choosing an optimal image path between said existing image and said requested image responsive to said calculating means, said optimal image path including a first subset of intermediate images; and means for generating said requested image as determined by said optimal image path.

20. A method for the efficient generation of a requested image from an existing image, wherein each image comprises a plurality of variable parameters, said method comprising the machine executed steps of:

determining a plurality of intermediate images between said requested image and said existing image;

building an image path network of representations of a plurality of image paths from said requested image to said existing image, each image path comprising a computational step required for conversion of a selected image to an alternate image, said image path network including representations of said plurality of intermediate images;

calculating a deterioration value for each of said plurality of image paths;

choosing an optimal image path between said existing image and said requested image responsive to said calculating means, said optimal image path including a first subset of intermediate images; and generating said requested image as determined by said optimal image path.

21. A computer system for generating a requested image from an existing image, wherein each image comprises a plurality of variable parameters, and wherein each image state comprises an image having specified values for each of said variable parameters, said computer system comprising:

means for adding a representation of said requested image to an image table;

means for adding a representation of said existing image to said image table;

means for adding representations of a plurality of intermediate images to said image table, each of said plurality of intermediate images corresponding to a change of an image state between said existing image and said first requested image;

means for building a plurality of image paths between said existing image and said first requested image, each image path comprising a computational step required for conversion of a selected image state to an alternate image state; means for calculating a computational complexity for each of said plurality of image paths;

means for choosing an optimal image path between said existing image and said requested image responsive to said calculating means, said optimal image path including a first subset of intermediate images; and means for generating said requested image as determined by said optimal image path.

* * * * *